US011456454B2

(12) United States Patent
Ma et al.

(10) Patent No.: US 11,456,454 B2
(45) Date of Patent: Sep. 27, 2022

(54) MIXED CONDUCTOR, ELECTROCHEMICAL DEVICE INCLUDING THE SAME, AND METHOD OF PREPARING THE MIXED CONDUCTOR

(71) Applicant: Samsung Electronics Co., Ltd., Suwon-si (KR)

(72) Inventors: Sangbok Ma, Suwon-si (KR); Hyukjae Kwon, Suwon-si (KR); Hyunpyo Lee, Seoul (KR); Donghwa Seo, Burlington, VA (US); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 265 days.

(21) Appl. No.: 16/654,611

(22) Filed: Oct. 16, 2019

(65) Prior Publication Data
US 2020/0136138 A1 Apr. 30, 2020

Related U.S. Application Data

(60) Provisional application No. 62/749,845, filed on Oct. 24, 2018.

(30) Foreign Application Priority Data

Dec. 21, 2018 (KR) .................. 10-2018-0167759

(51) Int. Cl.
*H01M 4/485* (2010.01)
*C01G 49/00* (2006.01)
(Continued)

(52) U.S. Cl.
CPC .......... *H01M 4/485* (2013.01); *C01G 49/009* (2013.01); *C01G 49/0027* (2013.01);
(Continued)

(58) Field of Classification Search
CPC .... H01M 4/485; H01M 4/52; C01G 49/0027; C01G 49/009; C01G 31/02; C01G 31/04; C01G 31/42; C01G 53/04; C01P 2002/32
See application file for complete search history.

(56) References Cited

U.S. PATENT DOCUMENTS 10,854,923 B2 * 12/2020 Xu .................... H01M 10/0569
10,862,120 B2 * 12/2020 Masese ................ C01G 49/00
(Continued)

FOREIGN PATENT DOCUMENTS

EP 0656667 A1 10/1994
WO 2013160280 A1 10/2013

OTHER PUBLICATIONS

Bhattacharya et al., "Relative stability of normal vs. inverse spinel for 3d transition metal oxides as lithium intercalation cathodes", Phys. Chem. Chem. Phys., 2013, 15, 6486.
(Continued)

*Primary Examiner* — Amanda C. Walke
(74) *Attorney, Agent, or Firm* — Cantor Colburn LLP

(57) ABSTRACT

A mixed conductor represented by Formula 1:

$$A_{1\pm x}M_{2\pm y}O_{4-\delta}$$ Formula 1 wherein, in Formula 1, A is a monovalent cation, and M is at least one of a monovalent cation, a divalent cation, a trivalent cation, a tetravalent cation, a pentavalent cation, or a hexavalent cation, $0 \leq x \leq 1$, $0 \leq y \leq 2$, and $0 \leq \delta \leq 1$, with the proviso that when M includes vanadium, $0 < \delta \leq 1$, and wherein the mixed conductor has an inverse spinel crystal structure.

27 Claims, 5 Drawing Sheets

(51) Int. Cl.
*C01G 53/00* (2006.01)
*H01M 10/0525* (2010.01)
*H01M 10/0562* (2010.01)
*H01M 12/02* (2006.01)
*H01M 12/08* (2006.01)

(52) U.S. Cl.
CPC ........ *C01G 53/42* (2013.01); *H01M 10/0525* (2013.01); *H01M 10/0562* (2013.01); *H01M 12/02* (2013.01); *H01M 12/08* (2013.01); *C01P 2002/32* (2013.01); *C01P 2002/72* (2013.01); *C01P 2006/40* (2013.01); *H01M 2300/0071* (2013.01)

(56) References Cited

U.S. PATENT DOCUMENTS

| | | | | |
|---|---|---|---|---|
| 11,127,980 | B2* | 9/2021 | Zhang | H01M 4/133 |
| 2013/0040806 | A1* | 2/2013 | Dismukes | B01J 35/004 |
| | | | | 502/159 |
| 2013/0260204 | A1* | 10/2013 | Xiao | H01M 12/08 |
| | | | | 429/105 |
| 2017/0018761 | A1 | 1/2017 | Ogino | |
| 2019/0260064 | A1* | 8/2019 | An | H01M 10/0418 |
| 2020/0119354 | A1* | 4/2020 | Kanamura | H01M 4/02 |
| 2020/0194802 | A1* | 6/2020 | Lee | C01G 53/42 |

OTHER PUBLICATIONS

Fey et al., "Synthesis, characterization and cell performance of inverse spinel electrode materials for lithium secondary batteries", Electrochimica Acta 45, 1999, 295-314.

EP European Search Report for European Patent Application No. 19204898.1 dated Mar. 2, 2020.

Fey et al., "Synthesis and characterization of a new inverse spinel LiNi1/3Co1/3Mn1/3VO4 for lithium-ion batteries", Materials Letters 60, 2006, 1209-1212.

Fey et al., "The effects of the stoichiometry and synthesis temperature on the preparation of the inverse spinel LiNiVO4 and its performance as a new high voltage cathode material", Journal of Power Sources, 68, 1997, 549-552.

Li et al., "NiMn2O4 as an efficient cathode catalyst for rechargeable lithium-air batterries*", Chem. Commun., 53, 2017, 8164.

* cited by examiner

MIXED CONDUCTOR, ELECTROCHEMICAL DEVICE INCLUDING THE SAME, AND METHOD OF PREPARING THE MIXED CONDUCTOR

CROSS-REFERENCE TO RELATED APPLICATIONS

This application claims priority to and the benefit of U.S. Provisional Application No. 62/749,845, filed on Oct. 24, 2018, in the U.S. Patent and Trademark Office, and Korean Patent Application No. 10-2018-0167759, filed on Dec. 21, 2018, in the Korean Intellectual Property Office, and all the benefits accruing therefrom under 35 U.S.C. § 119, the contents of which are incorporated herein in their entirety by reference.

BACKGROUND

1. Field

The present disclosure relates to a mixed conductor, an electrochemical device including the same, and a method of preparing the mixed conductor.

2. Description of the Related Art

In electrochemical devices such as a battery, an electrochemical reaction occurs in which ions and electrons move along separate migration paths between electrodes to be combined at the electrodes.

In the electrodes, an ionic conductor for conducting ions and an electronic conductor for conducting electrons are mixed and arranged.

Nonetheless, there is a need for an improved battery material, e.g., a material which is chemically stable to byproducts of electrochemical reactions and conducts both ions and electrons.

SUMMARY

Provided is a mixed conductor which is chemically stable and may conduct both ions and electrons.

Provided is an electrochemical device including the mixed conductor.

Provided is a method of preparing the mixed conductor.

Additional aspects will be set forth in part in the description which follows and, in part, will be apparent from the description, or may be learned by practice of the presented embodiment.

According to an aspect of an embodiment, there is provided a mixed conductor represented by Formula 1

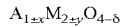  Formula 1 wherein, in Formula 1, A is a monovalent cation, M is at least one of a monovalent cation, a divalent cation, a trivalent cation, a tetravalent cation, a pentavalent cation, or a hexavalent cation, $0 \leq x \leq 1$, $0 \leq y \leq 2$, $0 \leq \delta \leq 1$, with the proviso that when M includes vanadium, $0 < \delta \leq 1$.

Also disclosed is an electrode including: a current collector; and the mixed conductor on the current collector.

According to an aspect, an electrochemical device includes a cathode; an anode; and an electrolyte between the cathode and the anode, wherein at least one of the cathode, the anode, and the electrolyte include the mixed conductor.

According to an aspect of another embodiment, a method of preparing the mixed conductor includes: mixing an A-element containing precursor and an M-element containing precursor to prepare a mixture; and thermally treating the mixture in a solid phase to prepare the mixed conductor.

BRIEF DESCRIPTION OF THE DRAWINGS

These and/or other aspects will become apparent and more readily appreciated from the following description of the embodiment, taken in conjunction with the accompanying drawings in which.

DETAILED DESCRIPTION

Figure 1:
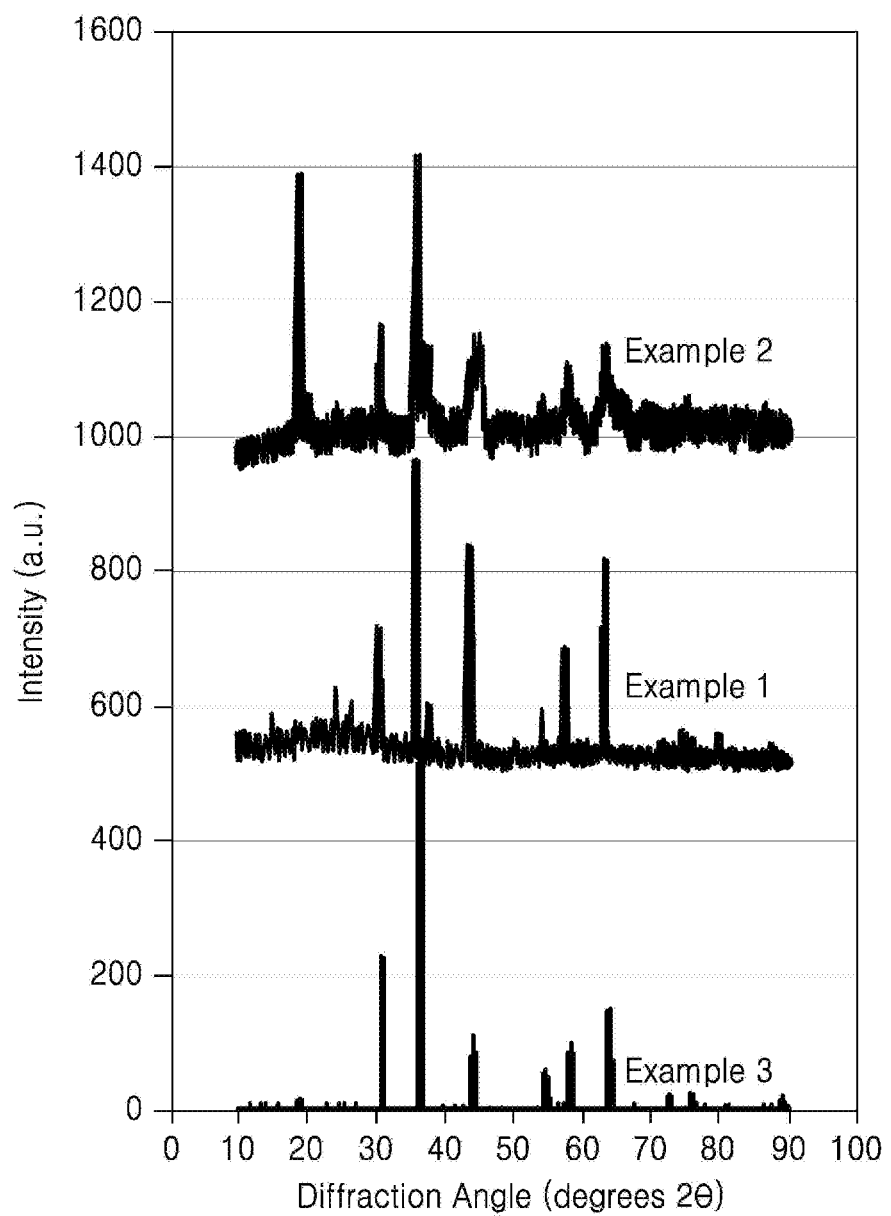
FIG. 1 is a graph of intensity (arbitrary units, a.u.) versus diffraction angle (degrees two-theta (2θ)) illustrating X-ray diffraction ("XRD") spectra of the mixed conductors prepared in Examples 1 to 3, in which the spectra of Examples 1 and 2 are offset for clarity.

The present inventive concept will now be described more fully with reference to the accompanying drawings, in which example an embodiment is shown. The present inventive concept may, however, be embodied in many different forms, should not be construed as being limited to the embodiment set forth herein, and should be construed as including all modifications, equivalents, and alternatives within the scope of the present inventive concept; rather, this embodiment is provided so that this inventive concept will be thorough and complete, and will fully convey the effects and features of the present inventive concept and ways to implement the present inventive concept to those skilled in the art.

The terminology used herein is for the purpose of describing a particular embodiment only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." "At least one" is not to be construed as limiting "a" or "an." "Or" means "and/or." As used herein, the term "and/or" includes any and all combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The sign "/" used herein may be construed as meaning "and" or "or," unless the context clearly indicates otherwise.

In the drawings, the size or thickness of each layer, region, or element are arbitrarily exaggerated or reduced for better understanding or ease of description, and thus the present inventive concept is not limited thereto. Throughout the written description and drawings, like reference numbers and labels will be used to denote like or similar elements. It will also be understood that when an element such as a layer, a film, a region or a component is referred to as being "on" another layer or element, it can be "directly on" the other layer or element, or intervening layers, regions, or components may also be present. Although the terms "first", "second", etc., may be used herein to describe various elements, components, regions, and/or layers, these elements, components, regions, and/or layers should not be limited by these terms. These terms are used only to distinguish one component from another, not for purposes of limitation.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, the term "mixed conductor" refers to a conductor concurrently having suitable ionic conductivity and suitable electronic conductivity. The mixed conductor exhibits improved ionic conductivity and electronic conductivity at the same time, as compared with $Li_4Ti_5O_{12}$.

"Spinel structure" as would be understood by an artisan in the solid state sciences and as is used herein means that the compound is isostructural with spinel, i.e., $MgAl_2O_4$ In a spinel structure, a cation corresponding to Al occupies an octahedral site and the cation corresponding to Mg occupies a tetrahedral site.

"Inverse spinel structure" as would be understood by an artisan in the solid state sciences and as is used herein means that the compound is isostructural with $Fe_3O_4$, in which the cations corresponding to $Fe^{2+}$ and half of the cations corresponding to $Fe^{3+}$ occupy a octahedral site, and the other half of the cations corresponding to $Fe^{3+}$ occupy a tetrahedral site.

Hereinafter, an embodiment of a mixed conductor, an electrochemical device including the mixed conductor, and a method of preparing the mixed conductor will be described in greater detail.

In the electrodes of an electrochemical device, an organic liquid electrolyte may be used as an ionic conductor, and a carbonaceous conducting agent may be used as an electronic conductor, for example. However, and while not wanting to be bound by theory, it is understood that an organic liquid electrolyte and a carbonaceous conducting agent may easily decomposed by a radical generated from an electrochemical reaction, leading to deterioration of battery performance. Furthermore, it is understood that in an electrode, a carbonaceous conducting agent may hinder diffusion and/or migration of ions, and an organic liquid electrolyte may hinder migration of electrons, thus increasing internal resistance of a battery.

According to an aspect of the disclosure, there is provided a mixed conductor represented by Formula 1.

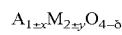   Formula 1

In Formula 1, A is be a monovalent cation, M is at least one of a monovalent cation, a divalent cation, a trivalent cation, a tetravalent cation, a pentavalent cation, or a hexavalent cation, 0≤x≤1, 0≤y≤2, and 0≤δ≤1, with the proviso that when M includes vanadium, 0<δ≤1, and wherein the mixed conductor has an inverse spinel crystal structure.

The mixed conductor exhibits improved ionic conductivity and electronic conductivity at the same time. Also, the mixed conductor is an inorganic oxide and is understood to be chemically stable in the presence of a radical, e.g., a radical from resulting from an electrochemical reaction, and thus may exhibit improved properties relative to other materials.

In an embodiment, A may be a monovalent alkali metal cation. In an aspect, the mixed conductor may be represented by Formula 2.

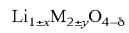   Formula 2

In Formula 2, L may be a monovalent alkali metal cation, and M may be at least one of a monovalent cation, a divalent cation, a trivalent cation, a tetravalent cation, a pentavalent cation, or a hexavalent cation. δ denotes an oxygen vacancy content, 0≤y≤1, 0≤y≤2, and 0≤δ≤1, with the proviso that when M includes vanadium (V), 0<δ, e.g., 0<δ≤1. In Formula 2, M is at least one metal element.

In an embodiment, L in the mixed conductor of Formula 2 may include at least one of Li, Na, or K. Use of Li is mentioned.

In an aspect, M may be at least one metal element. For example, M in the mixed conductor may include at least one of Co, Ni, Fe, Mn, V, Ti, Cr, Cu, Zn, Mo, Ru, Nb, Ta, Pd, Ag, Mg, Ca, Sr, Sc, Y, La, Ce, Pr, Nd, Sm, Eu, Gd, Tb, Dy, Ho, Er, Tm, Yb, Lu, Zr, Hf, Nb, Ta, W, Tc, Re, Ru, Os, Rh, Ir, Pd, Pt, Au, Cd, Hg, Al, Ga, In, Tl, Ge, Sn, Pb, Sb, Bi, Po, As, Se, or Te.

In an embodiment, the mixed conductor may be represented by Formula 3.

$$Li_{1\pm x}M_{2\pm y}O_{4-\delta} \quad \text{Formula 3}$$

In Formula 3, M may include at least one of Co, Ni, Fe, Mn, V, Ti, Cr, Cu, Zn, Mo, Ru, Nb, Ta, Pd, Ag, Mg, Ca, Sr, Sc, Y, La, Ce, Pr, Nd, Sm, Eu, Gd, Tb, Dy, Ho, Er, Tm, Yb, Lu, Zr, Hf, Nb, Ta, W, Tc, Re, Ru, Os, Rh, Ir, Pd, Pt, Au, Cd, Hg, Al, Ga, In, Tl, Ge, Sn, Pb, Sb, Bi, Po, As, Se, or Te. $\delta$ may denote an oxygen vacancy content, $0 \leq x \leq 1$, $0 \leq y \leq 2$, and $0 \leq \delta \leq 1$, and when M includes vanadium (V), $0 < \delta$, e.g., $0 < \delta \leq 1$.

$\delta$ may denote an oxygen vacancy content. In Formulae 1 to 3, $0 \leq \delta \leq 1$, $0 \leq \delta \leq 0.8$, $0 \leq \delta \leq 0.6$, $0 \leq \delta \leq 0.4$, $0 \leq \delta \leq 0.2$, $0 \leq \delta \leq 0.1$, $0 < \delta \leq 0.8$, $0.1 < \delta \leq 0.6$, $0.2 < \delta \leq 0.4$, $0.3 < \delta \leq 0.2$, or $0 < \delta \leq 0.1$.

In Formulae 1 to 3, M may be located in a tetrahedral site and an octahedral site of the inverse spinel crystal structure, e.g., M may be located in both a tetrahedral site and in an octahedral site of the inverse spinel crystal structure. Unlike the inverse spinel crystal structure, in a normal spinel crystal structure, M is located only in 8 octahedral sites, and a monovalent cation, e.g., A, L, or lithium, is located in a tetrahedral site.

In Formulae 1 to 3, M in the tetrahedral site may be at least one of a monovalent cation, a divalent cation, a trivalent cation, a tetravalent cation, a pentavalent cation, or a hexavalent cation, and the at least one cation belongs to a high spin system including three or more unpaired electrons in d-orbital. While not wanting to be bound by theory, it is understood that due to the metal cation M belonging to such a high spin system, the inverse spinel crystal structure may be easily obtained. In Formulae 1 to 3, M in the tetrahedral site may be at least one of Fe, V, Co, Ni, Mn, Ti, Cr, Cu, Zn, Mo, Ru, Nb, Ta, Pd, or Ag. In Formulae 1 to 3, M in the tetrahedral site and M in the octahedral site may have different oxidation numbers. For example, M may comprise $Fe^{2+}$ and $Fe^{3+}$, for example.

In an embodiment, the mixed conductor may be represented by Formula 4.

$$[M'_{1\pm y}]_{tet}[Li_{1\pm x}M''_{1\pm y}]_{oct}O_{4-\delta} \quad \text{Formula 4}$$

In Formula 4, M' and M'' may each independently include at least one of Co, Ni, Fe, Mn, V, Ti, Cr, Cu, Zn, Mo, Ru, Nb, Ta, Pd, Ag, Mg, Ca, Sr, Sc, Y, La, Ce, Pr, Nd, Sm, Eu, Gd, Tb, Dy, Ho, Er, Tm, Yb, Lu, Zr, Hf, Nb, Ta, W, Tc, Re, Ru, Os, Rh, Ir, Pd, Pt, Au, Cd, Hg, Al, Ga, In, Tl, Ge, Sn, Pb, Sb, Bi, Po, As, Se, or Te, $0 \leq x \leq 1$, $0 \leq y \leq 2$, and $0 \leq \delta \leq 1$, with the proviso that when M includes vanadium, $0 < \delta$, e.g., $0 \leq \delta \leq 1$. In Formula 4, M' may be located in a tetrahedral site ($[\ ]_{tet}$), M'' may be located in an octahedral site ($[\ ]_{oct}$), and lithium (Li) may be located in an octahedral site ($[\ ]_{oct}$). For example, in Formula 4, M' may have an oxidation number of +3, +4, or +5, and M'' may have an oxidation number of +2, +3, +4, or +5. For example, M' and M'' may have different oxidation numbers. In an aspect, for example, M' and M'' are a same element and have different oxidation numbers, e.g., $Fe^{2+}$ and $Fe^{3+}$. $\delta$ may denote an oxygen vacancy content. In an aspect, $0 \leq \delta \leq 1$, $0 \leq \delta \leq 0.8$, $0 \leq \delta \leq 0.6$, $0 \leq \delta \leq 0.4$, $0 \leq \delta \leq 0.2$, $0 \leq \delta \leq 0.1$, $0 < \delta \leq 0.8$, $0.1 < \delta \leq 0.6$, $0.2 < \delta \leq 0.4$, $0.3 < \delta \leq 0.2$, or $0 < \delta \leq 0.1$ In an embodiment, the mixed conductor may be at least one of $Li_{1\pm x}Fe_{2\pm y}O_{4-\delta}$ (wherein $0 \leq x \leq 0.5$, $0 \leq y \leq 1$, and $0 \leq \delta \leq 0.5$), $Li_{1\pm x}Ni_{2\pm y}O_{4-\delta}$ (wherein $0 \leq x \leq 0.5$, $0 \leq y \leq 1$, and $0 \leq \delta \leq 0.5$), $Li_{1\pm x}Co_{2\pm y}O_{4-\delta}$ (wherein $0 \leq x \leq 0.5$, $0 \leq y \leq 1$, and $0 \leq \delta \leq 0.5$), $Li_{1\pm x}Mn_{2\pm y}O_{4-\delta}$ (wherein $0 \leq \delta \leq 0.5$, $0 \leq y \leq 1$, and $0 \leq \delta \leq 0.5$), $Li_{1\pm x}V_{2\pm y}O_{4-\delta}$ (wherein $0 \leq x \leq 0.5$, $0 \leq y \leq 1$, and $0 < \delta \leq 0.5$), $Li_{1\pm x}Ti_{2\pm y}O_{4-\delta}$ (wherein $0 \leq x \leq 0.5$, $0 \leq y \leq 1$, and $0 \leq \delta \leq 0.5$), $Li_{1\pm x}Cr_{2\pm y}O_{4-\delta}$ (wherein $0 \leq x \leq 0.5$, $0 \leq y \leq 1$, and $0 \leq \delta \leq 0.5$), $Li_{1\pm x}Cu_{2\pm y}O_{4-\delta}$ (wherein $0 \leq x \leq 0.5$, $0 \leq y \leq 1$, and $0 \leq \delta \leq 0.5$), $Li_{1\pm x}Zn_{2\pm y}O_{4-\delta}$ (wherein $0 \leq x \leq 0.5$, $0 \leq y \leq 1$, and $0 \leq \delta \leq 0.5$), $Li_{1\pm x}Mo_{2\pm y}O_{4-\delta}$ (wherein $0 \leq x \leq 0.5$, $0 \leq y \leq 1$, and $0 \leq \delta \leq 0.5$), $Li_{1\pm x}Ru_{2\pm y}O_{4-\delta}$ (wherein $0 \leq x \leq 0.5$, $0 \leq y \leq 1$, and $0 \leq \delta \leq 0.5$), $Li_{1\pm x}Nb_{2\pm y}O_{4-\delta}$ (wherein $0 \leq x \leq 0.5$, $0 \leq y \leq 1$, and $0 \leq \delta \leq 0.5$), $Li_{1\pm x}Ta_{2\pm y}O_{4-\delta}$ (wherein $0 \leq x \leq 0.5$, $0 \leq y \leq 1$, and $0 \leq \delta \leq 0.5$), $Li_{1\pm x}Pd_{2\pm y}O_{4-\delta}$ (wherein $0 \leq x \leq 0.5$, $0 \leq y \leq 1$, and $0 \leq \delta \leq 0.5$), $Li_{1\pm x}Ag_{2\pm y}O_{4-\delta}$ (wherein $0 \leq x \leq 0.5$, $0 \leq y \leq 1$, and $0 \leq \delta \leq 0.5$), $Li_{1\pm x}Zr_{2\pm y}O_{4-\delta}$ (wherein $0 \leq x \leq 0.5$, $0 \leq y \leq 1$, and $0 \leq \delta \leq 0.5$), $Li_{1\pm x}Hf_{2\pm y}O_{4-\delta}$ (wherein $0 \leq x \leq 0.5$, $0 \leq y \leq 1$, and $0 \leq \delta \leq 0.5$), $Li_{1\pm x}Nb_{2\pm y}O_{4-\delta}$ (wherein $0 \leq x \leq 0.5$, $0 \leq y \leq 1$, and $0 \leq \delta \leq 0.5$), $Li_{1\pm x}Ta_{2\pm y}O_{4-\delta}$ (wherein $0 \leq x \leq 0.5$, $0 \leq y \leq 1$, and $0 \leq \delta \leq 0.5$), $Li_{1\pm x}W_{2\pm y}O_{4-\delta}$ (wherein $0 \leq x \leq 0.5$, $0 \leq y \leq 1$, and $0 \leq \delta \leq 0.5$), $Li_{1\pm x}Tc_{2\pm y}O_{4-\delta}$ (wherein $0 \leq x \leq 0.5$, $0 \leq y \leq 1$, and $0 \leq \delta \leq 0.5$), $Li_{1\pm x}Re_{2\pm y}O_{4-\delta}$ (wherein $0 \leq x \leq 0.5$, $0 \leq y \leq 1$, and $0 \leq \delta \leq 0.5$), $Li_{1\pm x}Ru_{2\pm y}O_{4-\delta}$ (wherein $0 \leq x \leq 0.5$, $0 \leq y \leq 1$, and $0 \leq \delta \leq 0.5$), $Li_{1\pm x}Os_{2\pm y}O_{4-\delta}$ (wherein $0 \leq y \leq 1$, and $0 \leq \delta \leq 0.5$), $Li_{1\pm x}Rh_{2\pm y}O_{4-\delta}$ (wherein $0 \leq x \leq 0.5$, $0 \leq y \leq 1$, and $0 \leq \delta \leq 0.5$), $Li_{1\pm x}Ir_{2\pm y}O_{4-\delta}$ (wherein $0 \leq x \leq 0.5$, $0 \leq y \leq 1$, and $0 \leq \delta \leq 0.5$), $Li_{1\pm x}Pd_{2\pm y}O_{4-\delta}$ (wherein $0 \leq x \leq 0.5$, $0 \leq y \leq 1$, and $0 \leq \delta \leq 0.5$), $Li_{1\pm x}Pt_{2\pm y}O_{4-\delta}$ (wherein $0 \leq x \leq 0.5$, $0 \leq y \leq 1$, and $0 \leq \delta \leq 0.5$), $Li_{1\pm x}Au_{2\pm y}O_{4-\delta}$ (wherein $0 \leq x \leq 0.5$, $0 \leq y \leq 1$, and $0 \leq \delta \leq 0.5$), $Li_{1\pm x}Cd_{2\pm y}O_{4-\delta}$ (wherein $0 \leq x \leq 0.5$, $0 \leq y \leq 1$, and $0 \leq \delta \leq 0.5$), $Li_{1\pm x}Hg_{2\pm y}O_{4-\delta}$ (wherein $0 \leq x \leq 0.5$, $0 \leq y \leq 1$, and $0 \leq \delta \leq 0.5$), $Li_{1\pm x}Al_{2\pm y}O_{4-\delta}$ (wherein $0 \leq x \leq 0.5$, $0 \leq y \leq 1$, and $0 \leq \delta \leq 0.5$), $Li_{1\pm x}Ga_{2\pm y}O_{4-\delta}$ (wherein $0 \leq x \leq 0.5$, $0 \leq y \leq 1$, and $0 \leq \delta \leq 0.5$), $Li_{1\pm x}In_{2\pm y}O_{4-\delta}$ (wherein $0 \leq x \leq 0.5$, $0 \leq y \leq 1$, and $0 \leq \delta \leq 0.5$), $Li_{1\pm x}Tl_{2\pm y}O_{4-\delta}$ (wherein $0 \leq x \leq 0.5$, $0 \leq y \leq 1$, and $0 \leq \delta \leq 0.5$), $Li_{1\pm x}Ge_{2\pm y}O_{4-\delta}$ (wherein $0 \leq x \leq 0.5$, $0 \leq y \leq 1$, and $0 \leq \delta \leq 0.5$), $Li_{1\pm x}Sn_{2\pm y}O_{4-\delta}$ (wherein $0 \leq x \leq 0.5$, $0 \leq y \leq 1$, and $0 \leq \delta \leq 0.5$), $Li_{1\pm x}Pb_{2\pm y}O_{4-\delta}$ (wherein $0 \leq y \leq 1$, and $0 \leq \delta \leq 0.5$), $Li_{1\pm x}Sb_{2\pm y}O_{4-\delta}$ (wherein $0 \leq x \leq 0.5$, $0 \leq y \leq 1$, and $0 \leq \delta \leq 0.5$), $Li_{1\pm x}Bi_{2\pm y}O_{4-\delta}$ (wherein $0 \leq x \leq 0.5$, $0 \leq y \leq 1$, and $0 \leq \delta \leq 0.5$), $Li_{1\pm x}Po_{2\pm y}O_{4-\delta}$ (wherein $0 \leq x \leq 0.5$, $0 \leq y \leq 1$, and $0 \leq \delta \leq 0.5$), or $Li_{1\pm x}As_{2\pm y}O_{4-\delta}$ (wherein $0 \leq x \leq 0.5$, $0 \leq y \leq 1$, and $0 \leq \delta \leq 0.5$).

In an embodiment, the mixed conductor may be at least one of $Li_{1\pm x}Fe_{1\pm a}Co_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Fe_{1\pm a}Ni_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Fe_{1\pm a}Mn_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Fe_{1\pm a}V_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Fe_{1\pm a}Ti_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Fe_{1\pm a}Cr_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Fe_{1\pm a}Cu_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Fe_{1\pm a}Zn_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Fe_{1\pm a}Mo_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Fe_{1\pm a}Ru_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Fe_{1\pm a}Nb_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Fe_{1\pm a}Ta_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Fe_{1\pm a}Pd_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), or $Li_{1\pm x}Fe_{1\pm a}Ag_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$).

In an embodiment, the mixed conductor may be at least one of $Li_{1\pm x}V_{1\pm a}Fe_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}V_{1\pm a}Co_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}V_{1\pm a}Ni_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}V_{1\pm a}Mn_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}V_{1\pm a}Ti_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}V_{1\pm a}Cr_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 < \delta \leq 0.5$), $Li_{1\pm x}V_{1\pm a}Cu_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 < \delta \leq 0.5$), $Li_{1\pm x}V_{1\pm a}Zn_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 < \delta \leq 0.5$), $Li_{1\pm x}V_{1\pm a}Mo_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 < \delta \leq 0.5$), $Li_{1\pm x}V_{1\pm a}Ru_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 < \delta \leq 0.5$), $Li_{1\pm x}V_{1\pm a}Nb_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 < \delta \leq 0.5$), $Li_{1\pm x}V_{1\pm a}Ta_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 < \delta \leq 0.5$), $Li_{1\pm x}V_{1\pm a}Pd_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 < \delta \leq 0.5$), or $Li_{1\pm x}V_{1\pm a}Ag_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 < \delta \leq 0.5$).

In an embodiment, the mixed conductor may be at least one of $Li_{1\pm x}Co_{1\pm a}Fe_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Co_{1\pm a}Mn_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Co_{1\pm a}V_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Co_{1\pm a}Ti_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Co_{1\pm a}Cr_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Co_{1\pm a}Cu_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Co_{1\pm a}Zn_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Co_{1\pm a}Mo_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Co_{1\pm a}Ru_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Co_{1\pm a}Nb_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Co_{1\pm a}Ta_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Co_{1\pm a}Pd_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), or $Li_{1\pm x}Co_{1\pm a}Ag_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$).

In an embodiment, the mixed conductor may be at least one of $Li_{1\pm x}Ni_{1\pm a}Co_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ni_{1\pm a}Fe_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ni_{1\pm a}Mn_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ni_{1\pm a}V_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ni_{1\pm a}Ti_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ni_{1\pm a}Cr_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ni_{1\pm a}Cu_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ni_{1\pm a}Zn_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ni_{1\pm a}Mo_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ni_{1\pm a}Ru_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ni_{1\pm a}Nb_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ni_{1\pm a}Ta_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ni_{1\pm a}Pd_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), or $Li_{1\pm x}Ni_{1\pm a}Ag_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$).

In an embodiment, the mixed conductor may be at least one of $Li_{1\pm x}Mn_{1\pm a}Co_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Mn_{1\pm a}Fe_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Mn_{1\pm a}V_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Mn_{1\pm a}Ti_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Mn_{1\pm a}Cr_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Mn_{1\pm a}Cu_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Mn_{1\pm a}Zn_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Mn_{1\pm a}Mo_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Mn_{1\pm a}Ru_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Mn_{1\pm a}Nb_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Mn_{1\pm a}Ta_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Mn_{1\pm a}Pd_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), or $Li_{1\pm x}Mn_{1\pm a}Ag_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$).

In an embodiment, the mixed conductor may be at least one of $Li_{1\pm x}Ti_{1\pm a}Co_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ti_{1\pm a}Fe_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ti_{1\pm a}V_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ti_{1\pm a}Cr_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ti_{1\pm a}Cu_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ti_{1\pm a}Zn_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ti_{1\pm a}Mo_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ti_{1\pm a}Ru_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ti_{1\pm a}Nb_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ti_{1\pm a}Ta_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Ti_{1\pm a}Pd_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), or $Li_{1\pm x}Ti_{1\pm a}Ag_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$).

In an embodiment, the mixed conductor may be at least one of $Li_{1\pm x}Cr_{1\pm a}Co_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Cr_{1\pm a}Fe_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Cr_{1\pm a}V_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Cr_{1\pm a}Cu_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Cr_{1\pm a}Zn_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Cr_{1\pm a}Mo_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Cr_{1\pm a}Ru_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Cr_{1\pm a}Nb_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Cr_{1\pm a}Ta_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Cr_{1\pm a}Pd_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), or $Li_{1\pm x}Cr_{1\pm a}Ag_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$).

In an embodiment, the mixed conductor may be at least one of $Li_{1\pm x}Cu_{1\pm a}Co_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Cu_{1\pm a}Fe_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Cu_{1\pm a}V_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Cu_{1\pm a}Cr_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Cu_{1\pm a}Zn_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Cu_{1\pm a}Mo_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Cu_{1\pm a}Ru_{1\pm b}O_{4-\delta}$ (wherein $0 \leq x \leq 0.5$, $0 \leq a \leq 0.5$, $0 \leq b \leq 0.5$, $0 \leq a+b \leq 1$, and $0 \leq \delta \leq 0.5$), $Li_{1\pm x}Cu_{1\pm a}Nb_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Cu_{1\pm a}Ta_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Cu_{1\pm a}Pd_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), or $Li_{1\pm x}Cr_{1\pm a}Ag_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$).

In an embodiment, the mixed conductor may be at least one of $Li_{1\pm x}Zn_{1\pm a}Co_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Zn_{1\pm a}Fe_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Zn_{1\pm a}V_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Zn_{1\pm a}Cr_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Zn_{1\pm a}Mo_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Zn_{1\pm a}Ru_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Zn_{1\pm a}Nb_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Zn_{1\pm a}Ta_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Zn_{1\pm a}Pd_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), or $Li_{1\pm x}Zn_{1\pm a}Ag_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$).

In an embodiment, the mixed conductor may be at least one of $Li_{1\pm x}Mo_{1\pm a}Co_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Mo_{1\pm a}Fe_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Mo_{1\pm a}V_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Mo_{1\pm a}Cr_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Mo_{1\pm a}Ru_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Mo_{1\pm a}Nb_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Mo_{1\pm a}Ta_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Mo_{1\pm a}Pd_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), or $Li_{1\pm x}Mo_{1\pm a}Ag_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$).

In an embodiment, the mixed conductor may be at least one of $Li_{1\pm x}Ru_{1\pm a}Co_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Ru_{1\pm a}Fe_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Ru_{1\pm a}V_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Ru_{1\pm a}Cr_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Ru_{1\pm a}Nb_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Ru_{1\pm a}Ta_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Ru_{1\pm a}Pd_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), or $Li_{1\pm x}Ru_{1\pm a}Ag_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$).

In an embodiment, the mixed conductor may be at least one of $Li_{1\pm x}Nb_{1\pm a}Co_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Nb_{1\pm a}Fe_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Nb_{1\pm a}V_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Nb_{1\pm a}Cr_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Nb_{1\pm a}Ta_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Nb_{1\pm a}Pd_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), or $Li_{1\pm x}Nb_{1\pm a}Ag_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$).

In an embodiment, the mixed conductor may be at least one of $Li_{1\pm x}Ta_{1\pm a}Co_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Ta_{1\pm a}Fe_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Ta_{1\pm a}V_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Ta_{1\pm a}Cr_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Ta_{1\pm a}Pd_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), or $Li_{1\pm x}Ta_{1\pm a}Ag_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$).

In an embodiment, the mixed conductor may be at least one of $Li_{1\pm x}Pd_{1\pm a}Co_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Pd_{1\pm a}Fe_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Pd_{1\pm a}V_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Pd_{1\pm a}Cr_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), or $Li_{1\pm x}Pd_{1\pm a}Ag_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$).

In an embodiment, the mixed conductor may be at least one of $Li_{1\pm x}Ag_{1\pm a}Co_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Ag_{1\pm a}Fe_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Ag_{1\pm a}V_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$), $Li_{1\pm x}Ag_{1\pm a}Cr_{1\pm b}O_{4-\delta}$ (wherein $0 \le x \le 0.5$, $0 \le a \le 0.5$, $0 \le b \le 0.5$, $0 \le a+b \le 1$, and $0 \le \delta \le 0.5$).

The mixed conductor according to an embodiment may have an electronic conductivity greater than an ionic conductivity at the same temperature. The mixed conductor according to an embodiment exhibits both suitable ionic conductivity and suitable electronic conductivity at the same time, and the ionic conductivity may be greater than the electronic conductivity. For example, the ionic conductivity of the mixed conductor may be about 1 time or greater, about 1.5 times or greater, about 2 times or greater, about 2.5 times or greater, about 3 times or greater, about 3.5 times or greater, or about 4 times or greater, e.g., about 1 time to about 10 times, about 1.5 times to about 10 times, about 2 times to about 10 times, about 2.5 times to about 10 times, about 3 times to about 10 times, about 3.5 times to about 10 times, or about 4 times to about 10 times greater than the electronic conductivity thereof at the same temperature. For example, the ionic conductivity of the mixed conductor may be greater than that of $Li_4Ti_5O_{12}$ by about $1\times10$ Siemens per centimeter (S/cm) or greater at the same temperature. For example, a ratio of the ionic conductivity of the mixed conductor to the electronic conductivity of the mixed conductor may be about 100 to about 1, about 90 to about 2, or about 50 to about 5.

In an embodiment, the mixed conductor may have an electronic conductivity of about $1.0\times10^{-7}$ S/cm or greater, about $5.0\times10^{-7}$ S/cm or greater, about $1.0\times10^{-6}$ S/cm or greater, about $5.0\times10^{-6}$ S/cm or greater, about $1.0\times10^{-5}$ S/cm or greater, or about $1.0\times10^{-4}$ S/cm or greater, e.g., about $1\times10^{-7}$ S/cm to about $1\times10^{-3}$ S/cm, about $5\times10^{-7}$ S/cm about $5\times10^{-4}$ S/cm, about $1\times10^{-6}$ S/cm to about $1\times10^{-4}$ S/cm, or about $5\times10^{-6}$ S/cm to about $5\times10^{-5}$ S/cm at room temperature, e.g., at 25° C. Due to the mixed conductor having such a high electronic conductivity, an electrochemical device including the mixed conductor according to an embodiment may have decreased internal resistance.

In an embodiment, the mixed conductor may have an ionic conductivity of about $5.0\times10^{-7}$ S/cm or greater, about $1.0\times10^{-6}$ S/cm or greater, about $5.0\times10^{-6}$ S/cm or greater, about $1.0\times10^{-5}$ S/cm or greater, or about $1.0\times10^{-4}$ S/cm at room temperature e.g., about $1\times10^{-6}$ S/cm to about $1\times10^{-3}$ S/cm, about $5\times10^{-6}$ S/cm about $5\times10^{-4}$ S/cm, or about $1 \times 10^{-5}$ S/cm to about $1 \times 10^{-4}$ S/cm, e.g., at 25 °C. Due to the mixed conductor having such a high ionic conductivity, an electrochemical device including the mixed conductor according to an embodiment may have decreased internal resistance.

The electronic conductivity may be determined by an eddy current method or a kelvin bridge method. The electrical conductivity can be determined according to ASTM B-193, "Standard Test Method for Resistivity of Electrical Conductor Materials," e.g., at 25° C., or according to ASTM E-1004, "Standard Test Method for Determining Electrical Conductivity Using the Electromagnetic (Eddy-Current) Method," e.g., at 25° C. Additional details may be determined by one of skill in the art without undue experimentation.

Ionic conductivity may be determined by a complex impedance method at 25° C., further details of which can be found in J.-M. Winand et al., "Measurement of Ionic Conductivity in Solid Electrolytes," Europhysics Letters, vol. 8, no. 5, p. 447-452, 1989.

In an embodiment, the mixed conductor may exhibit a diffraction peak corresponding to the (220) plane of the inverse spinel crystal structure at a diffraction angle of 31°±2.0° 2θ in an X-ray diffraction ("XRD") spectrum thereof, when analyzed using Cu Kα radiation. The peak at a diffraction angle of 31°±2.0° 2θ may be a peak originating from an element located in a tetrahedral site of the spinel crystal structure. The peak does not appear when Li is in a tetrahedral site, and appears when a metal other than Li is located in a tetrahedral site. Accordingly, the mixed conductor according to an embodiment may have an inverse spinel crystal structure with a metal other than lithium in the tetrahedral site of the crystal structure. Unlike the mixed conductor, in an XRD spectrum of a conductor with a normal spinel crystal structure, a diffraction peak corresponding to the (220) plane of the inverse spinel crystal structure does not appear at a diffraction angle of 31°±2.0° 2θ, and only a peak corresponding to the normal spinel crystal structure appears.

For example, a band gap between a valence band and a conduction band of the mixed conductor according to an embodiment may be less than a band gap of $Li_4Ti_5O_{12}$ having a normal spinel crystal structure. For example, the mixed conductor may have a band gap between a valence ban and a conduction band of, for example, about 2 electron volts (eV) or less, about 1.8 eV or less, about 1.6 eV or less, about 1.4 eV or less, or about 1.2 eV or less, e.g., about 2 eV to about 0.01 eV, about 1.8 eV to about 0.05 eV, about 1.6 eV to about 0.1 eV, or about 1.4 eV to about 0.5 eV. When the mixed conductor has a small band gap between the valance band and the conduction band within these ranges, migration of electrons from the valence band to the conduction band may be facilitated, and the mixed conductor may have improved electronic conductivity.

The mixed conductor according to an embodiment may exhibit further improved ionic conductivity due to the inclusion of an oxygen vacancy. For example, the mixed conductor according to an embodiment may exhibit a state density function which is shifted near the Fermi energy (Fermi energy, Ef), due to the inclusion of an oxygen vacancy, and have a decreased band gap between the valence band and the conduction band. As a result, the mixed conductor may have further improved electronic conductivity.

Figure 4:
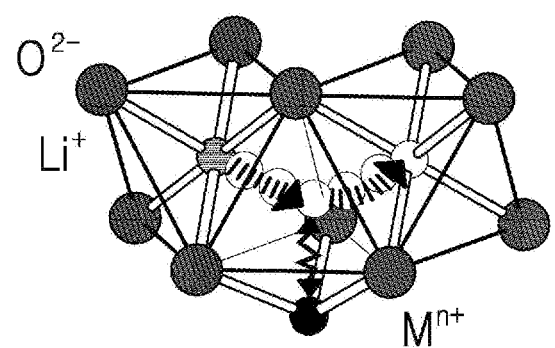
FIG. 4 is a schematic view of a portion of an inverse spinel crystal structure of $LiFe_2O_4$, which is a mixed conductor according to Example 1.

In the mixed conductor according to an embodiment, A in Formula 1 may be located in an octahedral 16*d* site of the inverse spinel crystal structure, as illustrated in FIG. 4.

Referring to FIG. 4, when A is lithium, an activation energy (Ea, 16*d*->8*b*->16*d*) for a lithium transition from an octahedral 16*d* site to another octahedral 16*d* site via a tetrahedral 8*b* site in the mixed conductor is less than an activation energy (Ea, 8*a*->16*c*->8*a*) for a lithium transition from a tetrahedral 8*a* siteto another tetrahedral 8*a* site via an octahedral 16*c* sitein $Li_4Ti_5O_{12}$ having a normal spinel crystal structure. Due to the mixed conductor having a smaller activation energy when a lithium transition occurs, relative to $Li_4Ti5O_{12}$,transfer, diffusion, or a combination thereof of lithium ions in the mixed conductor may be facilitated. As a result, the mixed conductor may have an increased ionic conductivity, as compared with $Li_4TiO_{12}$.

According to an aspect of the disclosure, there is provided an electrochemical device including the mixed conductor according to an embodiment. By the inclusion of the mixed conductor which may be chemically stable and may conduct ions and electrons at the same time, deterioration of the electrochemical device may be suppressed.

In an embodiment, the electrochemical device may be, for example, at least one of a battery, an accumulator, a supercapacitor, a fuel cell, a sensor, or an electrochromic device. However, the disclosed embodiment is not limited thereto. Any suitable electrochemical device may be used.

The battery may be, for example, a primary battery or a secondary battery. The battery may be, for example, a lithium battery, a sodium battery, or the like. However, the disclosed embodiment is not limited thereto. Any suitable type of battery may be used. The lithium battery may be, for example, a lithium-ion battery or a lithium-air battery. However, the disclosed embodiment is not limited thereto. Any suitable type of lithium battery may be used. The electrochromic device may be an electrochemical mirror, a window, a screen, or a facade. However, the disclosed embodiment is not limited thereto. Any suitable electrochromic device may be used.

In an embodiment, the electrochemical device may include a cathode, and the cathode may include the mixed conductor according to an embodiment.

In an embodiment, the electrochemical device including the mixed conductor according to an embodiment may be, for example, a lithium-air battery. The lithium-air battery may include a cathode. The cathode may be an air electrode. For example, the cathode may be arranged on a cathode current collector.

The cathode may include the mixed conductor according to an embodiment. An amount of the mixed conductor in the cathode may be, for example, in a range of greater than 0 weight percent (wt %) to about 100 wt %, about 0.1 wt % to about 100 wt %, about 1 wt % to about 99 wt %, about 5 wt % to about 95 wt %, or about 10 wt % to about 90wt %, each based on a total weight of the cathode.

In an embodiment, the cathode may consist of the mixed conductor according to an embodiment.

In an embodiment, the cathode may further include, in addition to the mixed conductor, other materials which may be used in lithium-air batteries, for example, a conductive material, a catalyst, a binder, or the like.

The cathode may further include a conductive material. For example, the conductive material may be porous. Due to the porosity of the conductive material, air permeation may be facilitated. The conductive material may be any suitable material having porosity, conductivity, or a combination thereof. For example, the conductive material may be a carbonaceous material having porosity. The carbonaceous material may be, for example, carbon black, graphite, graphene, activated carbon, carbon fiber, or a combination thereof. However, the disclosed embodiment is are not limited thereto. Any suitable carbonaceous material may be used. The conductive material may be, for example, a metallic material. For example, the metallic material may be metal fiber, metal mesh, metal powder, or the like. The metal powder may be, for example, copper, silver, nickel, or aluminum in powder form. The conductive material may be, for example, an organic conductive material. The organic conductive material may be, for example, polyphenylene derivatives, polythiophene derivatives, or the like. For example, the above-listed conductive materials may be used alone or in a combination thereof.

In an embodiment, the cathode may further include a catalyst for oxidation/reduction of oxygen. Examples of the catalyst may include: precious metal-based catalysts such as platinum, gold, silver, palladium, ruthenium, rhodium, and osmium; oxide-based catalysts such as manganese oxide, iron oxide, cobalt oxide, and nickel oxide; and an organic metal-based catalyst such as cobalt phthalocyanine. However, the disclosed embodiment is not limited thereto. Any suitable catalyst for oxidation/reduction of oxygen may be used.

In an embodiment, the catalyst may be supported on a support. The support may be an oxide support, a zeolite support, a clay-based mineral support, a carbon support, or the like. The oxide support may be a metal oxide support including at least one metal of aluminum (Al), silicon (Si), zirconium (Zr), titanium (Ti), cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), or tungsten (W). Examples of the oxide support may include alumina, silica, zirconium oxide, and titanium dioxide. Examples of the carbon support may include carbon blacks such as Ketjen black, acetylene black, channel black, and lamp black; graphite such as natural graphite, artificial black, and expandable graphite; activated carbons; and carbon fibers. However, the disclosed embodiment is are not limited thereto. Any suitable catalyst support may be used.

In an embodiment, the cathode may further include a binder. For example, the binder may include a thermoplastic resin or a thermocurable resin. For example, the binder may be polyethylene, polypropylene, polytetrafluoroethylene ("PTFE"), polyvinylidene fluoride ("PVdF"), styrene-butadiene rubber, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, or an ethylene-acrylic acid copolymer, which may be used alone or in a combination thereof. However, the disclosed embodiment is are not limited thereto. Any suitable binder may be used.

In an embodiment, the cathode may be manufactured by mixing the mixed conductor according to an embodiment, a conductive material, a catalyst for oxidation/reduction of oxygen, and a binder together and adding an appropriate solvent thereto to prepare a cathode slurry, and coating the cathode slurry on a surface of a substrate and drying a coated resultant, or optionally compression-molding a dried product to improve an electrode density. For example, the substrate may be a cathode current collector, a separator, or a solid electrolyte membrane. For example, the cathode current collector may be a gas diffusion layer. The conductive material may be, for example, a composite conductor. For example, the conductive material, the catalyst for oxidation/reduction of oxygen and the binder may be omitted according to a type of the cathode.

In an embodiment, the lithium-air battery may include an anode. The anode may include lithium.

In an embodiment, the anode may be, for example, a lithium metal thin film or a lithium-based alloy thin film. The lithium-based alloy may be, for example, a lithium alloy with, for example, aluminum, tin, magnesium, indium, calcium, titanium, or vanadium. For example, the anode may include the mixed conductor according to an embodiment.

In an embodiment, the lithium-air battery may include an electrolyte membrane between the cathode and the anode.

For example, the electrolyte membrane may include at least one of a solid electrolyte, a gel electrolyte, or a liquid electrolyte. The solid electrolyte, the gel electrolyte, and the liquid electrolyte are not specifically limited. Any suitable electrolyte may be used. For example, the electrolyte membrane may include the mixed conductor according to an embodiment.

In an embodiment, the solid electrolyte may include at least one of a solid electrolyte including an ionically conducting inorganic material, a solid electrolyte including a polymeric ionic liquid ("PIL") and a lithium salt, a solid electrolyte including an ionically conducting polymer and a lithium salt, or a solid electrolyte including an electronically conducting polymer. However, the disclosed embodiment is not limited thereto. Any suitable solid electrolyte may be used.

For example, the ionically conducting inorganic material may include at least one of a glass or amorphous metal ion conductor, a ceramic active metal ion conductor, or a glass ceramic active metal ion conductor. However, the disclosed embodiment is not limited thereto. Any suitable ionically conducting inorganic material may be used. For example, the ionically conducting inorganic material may be ionically conducting inorganic particles or a molded product thereof, for example, in sheet form.

For example, the ionically conducting inorganic material may be at least one of $BaTiO_3$, $Pb(Zr_aTi_{1-a})O_3$ wherein $0 \leq a \leq 1$ ("PZT"), $Pb_{1-x}La_xZr_{1-y}Ti_yO_3$ ("PLZT", wherein $0 \leq x \leq 1$ and $0 \leq y < 1$), $Pb(Mg_3Nb_{2/3})O_3$—$PbTiO_3$ ("PMN-PT"), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), a lithium titanium phosphate ($Li_xTi_y(PO_4)_3$, wherein $0<x<2$ and $0<y<3$), a lithium aluminum titanium phosphate ($Li_xAl_yTi_z(PO_4)_3$, wherein $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (wherein and $0 \leq b \leq 1$), a lithium lanthanum titanate ($Li_xLa_yTiO_3$, wherein $0<x<2$, and $0<y<3$), a lithium germanium thiophosphate ($Li_xGe_yP_zS_w$, wherein $0<x<4$, $0<y<1$, $0<z<1$, and $0<w<5$), a lithium nitride ($Li_xN_y$, wherein $0<x<4$, and $0<y<2$), $SiS_2$-based glass, $Li_xSi_yS_z$ (wherein $0<x<3,0<y<2$, and $0<z<4$), $P_2S_5$-based glass, $Li_xP_yS_z$ (wherein $0<x<3$, $0<y<3$, and $0<z<7$), a $Li_2O$-based ceramic, a LiF-based ceramic, a LiOH-based ceramic, a $Li_2CO_3$-based ceramic, a $LiAlO_2$-based ceramic, a $Li_2O$—$Al_2O_3$—$SiO_2$—$P_2O_5$13 $TiO_2$—$GeO_2$-based ceramic, a Garnet-based ceramic ($Li_{3+x}La_3M_2O_{12}$, wherein M=Te, Nb, or Zr)), or a combination thereof.

For example, the polymeric ionic liquid ("PIL") may include a repeating unit including: i) a cation of at least one of an ammonium-based cation, a pyrrolidinium-based cation, a pyridinium-based cation, a pyrimidinium-based cation, an imidazolium-based cation, a piperidinum-based cation, a pyrazolium-based cation, an oxazolium-based cation, a pyridazinium-based cation, a phosphonium-based cation, a sulfonium-based cation, or a triazolium-based cation; and ii) at least one anion of $BF_4{-}$, $PF_6{-}$, $AsF_6{-}$, $SbF_6{-}$, $AlCl_4{-}$, $HSO_4{-}$, $ClO_4{-}$, $CH_3SO_3{-}$, $CF_3CO_2{-}$, $(CF_3SO_2)_2N{-}$, $Cl{-}$, $Br{-}$, $I{-}$, $SO_4{-}$, $CF_3SO_3{-}$, $(C_2F_5SO_2)_2N{-}$, $(C_2F_5SO_2)(CF_3SO_2)N{-}$, $NO_3{-}$, $Al_2Cl_7{-}$, $CF_3COO{-}$, $CH_3COO{-}$, $CF_3SO_3{-}$, $(CF_3SO_2)_3C{-}$, $(CF_3CF_2SO_2)_2N{-}$, $(CF_3)_2PF_4{-}$, $(CF_3)_3PF_3{-}$, $(CF_3)_4PF_2{-}$, $(CF_3)_5PF{-}$, $(CF_3){-}$, $SF_5CF_2SO_3{-}$, $SF_5CHFCF_2SO_3{-}$, $CF_3CF_2(CF_3)_2CO{-}$, $(CF_3SO_2)_2CH{-}$, $(SF_5)_3C{-}$, $(O(CF_3)_2C_2(CF_3)_2O)_2PO{-}$, or $(CF_3SO_2)_2N{-}$. For example, the polymeric ionic liquid ("PIL") may be poly(diallyldimethylammonium) bis ((trifluoromethanesulfonyl)imide ("TFSI")), poly(1-allyl-3-methylimidazolium bis (trifluoromethanesulfonyl)imide), and poly((N-methyl-N-propylpiperidinium bis(trifluoromethanesulfonyl)imide.

The ionically conducting polymer may include at least one ion conductive repeating unit of an ether-based monomer, an acryl-based monomer, a methacryl-based monomer, or a siloxane-based monomer.

The ionically conducting polymer may include, for example, polyethylene oxide ("PEO"), polyvinyl alcohol ("PVA"), polyvinyl pyrrolidone ("PVP"), polyvinyl sulfone, polypropylene oxide ("PPO"), polymethylmethacrylate, polyethylmethacrylate, polydimethylsiloxane, polyacrylic acid, polymethacrylic acid , poly(methyl acrylate), poly(ethyl acrylate), poly(2-ethylhexyl acrylate), poly(butyl methacrylate), poly(2-ethylhexyl methacrylate), poly(decyl acrylate), polyethylene vinyl acetate, a phosphate ester polymer, polyester sulfide, polyvinylidene fluoride ("PVdF"), or Li-substituted Nafion. However, the disclosed embodiment is not limited thereto. Any suitable ionically conducting polymer may be used.

The electronically conducting polymer may be, for example, a polyphenylene derivative or a polythiophene derivative. However, the disclosed embodiment is not limited thereto. Any suitable electronically conducting polymer may be used.

In an embodiment, the gel electrolyte may be obtained, for example, by adding a low-molecular weight solvent to a solid electrolyte interposed between the cathode and the anode. The gel electrolyte may be a gel electrolyte obtained by further adding a low-molecular weight organic compound such as a solvent, an oligomer, or the like to the polymer. The gel electrolyte may be a gel electrolyte obtained by further adding a low-molecular weight organic compound such as a solvent or an oligomer to any of the above-listed polymer electrolytes.

In an embodiment, the liquid electrolyte may include a solvent and a lithium salt. The solvent may include at least one of an organic solvent, an ionic liquid ("IL"), or an oligomer. However, the disclosed embodiment is are not limited thereto. Any suitable solvent that is in liquid form at room temperature (25° C.) may be used.

The organic solvent may include, for example, at least one of an ether-based solvent, a carbonate-based solvent, an ester-based solvent, or a ketone-based solvent. For example, the organic solvent may include at least one of propylene carbonate, ethylene carbonate, fluoroethylene carbonate, vinylethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, dimethyl acetamide, dimethylsulfoxide, dioxane, 1,2-dimethoxyethane, sulfolane, dichloroethane, chlorobenzene, nitrobenzene, succinonitrile, diethylene glycol dimethyl ether ("DEGDME"), tetraethylene glycol dimethyl ether ("TEGDME"), polyethylene glycol dimethyl ether ("PEGDME", number average molecular weight (Mn)=~500), dimethyl ether, diethyl ether, dibutyl ether, dimethoxyethane, 2-methyltetrahydrofuran, or tetrahydrofuran. However, the disclosed embodiment is not limited thereto. The organic solvent may be any suitable organic solvent that is in liquid form at room temperature.

The ionic liquid ("IL") may include, for example, i) at least one cation of an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, or a triazolium-based cation, and ii) at least one anion of $BF_4{-}$, $PF_6{-}$, $AsF_6{-}$, $SbF_6{-}$, $AlCl_4{-}$, $HSO_4{-}$, $ClO_4{-}$, $CH_3SO_3{-}$, $CF_3CO_2{-}$, $(CF_3SO_2)_2N{-}$, $Cl{-}$, $Br{-}$, $I{-}$, $BF_4{-}$, $SO_4{-}$, $PF_6{-}$, $ClO_4{-}$, $CF_3SO_3{-}$, $CF_3CO_2{-}$, $(C_2F_5SO_2)_2N{-}$, $(C_2F_5SO_2)(CF_3SO_2)N{-}$, $NO_3{-}$, $Al_2Cl_7{-}$, $AsF_6{-}$, $SbF_6{-}$, $CF_3COO{-}$, $CH_3COO{-}$, $CF_3SO_3{-}$, $(CF_3SO_2)_3C{-}$, $(CF_3CF_2SO_2)_2N{-}$, $(CF_3)_2PF_4{-}$, $(CF_3)_3PF_3{-}$, $(CF_3)_4PF_2{-}$, $(CF_3)_5PF{-}$, $(CF_3)_6P{-}$, $SF_5CF_2SO_3{-}$, $SF_5CHFCF_2SO_3{-}$, $CF_3CF_2(CF_3)_2CO{-}$, $(CF_3SO_2)_2CH{-}$, $(SF_5)_3C{-}$, $(O(CF_3)_2C_2(CF_3)_2O)_2PO{-}$, or $(CF_3SO_2)_2N{-}$.

The lithium salt may include at least one of Lithium bis(trifluoromethanesulfonyl)imide ("LiTFSI"), $LiPF_6$, $LiBF_4$, $LiAsF_6$, $LiClO_4$, $LiNO_3$, (lithium bis(oxalato) borate (LiBOB), $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, or lithium trifluoromethanesulfonate ("LiTf0") However, the disclosed embodiment is not limited thereto. Any suitable lithium salt material may be used. A concentration of the lithium salt may be, for example, about 0.01 M to about 5.0 M.

In an embodiment, the lithium-air battery may further include a separator between the cathode and the anode. Any suitable separator may be used as long as being durable under operation conditions of the lithium-air battery. For example, the separator may include a polymer non-woven fabric, for example, a non-woven fabric of polypropylene material or a non-woven fabric of polyphenylene sulfide; a porous film of an olefin resin such as polyethylene or polypropylene; or glass fiber. Two or more separators may be used.

For example, the electrolyte membrane may have a structure in which a solid polymer electrolyte is impregnated in the separator, or a structure in which a liquid electrolyte is impregnated in the separator. For example, the electrolyte membrane in which a solid polymer electrolyte is impregnated in the separator may be prepared by arranging solid polymer electrolyte films on opposite surfaces of the separator, and roll-pressing them at the same time. For example, the electrolyte membrane in which a liquid electrolyte is impregnated in the separator may be prepared by injecting a liquid electrolyte including a lithium salt into the separator.

In an embodiment, the lithium-air battery may be manufactured by installing the anode on an inner side of a case, sequentially arranging the electrolyte membrane on the anode, the cathode on the electrolyte membrane, and a porous cathode current collector on the cathode, and then arranging a pressing member on the porous cathode current collector to press a resulting cell structure with the pressing member so as to allow air to be transferred to the air electrode (i.e., cathode). The case may be divided into upper and lower portions which contact the anode and the air electrode, respectively. An insulating resin may be disposed between the upper and lower portions of the case to electrically insulate the cathode and the anode from one another.

The lithium-air battery according to an embodiment may be used as a lithium primary battery or a lithium secondary battery. The lithium-air battery may have any suitable shape of, for example, a coin, a button, a sheet, a stack, a cylinder, a plane, or a horn. However, the disclosed embodiment is not limited thereto. The lithium-air battery may be used in a large battery for electric vehicles.

Figure 5:
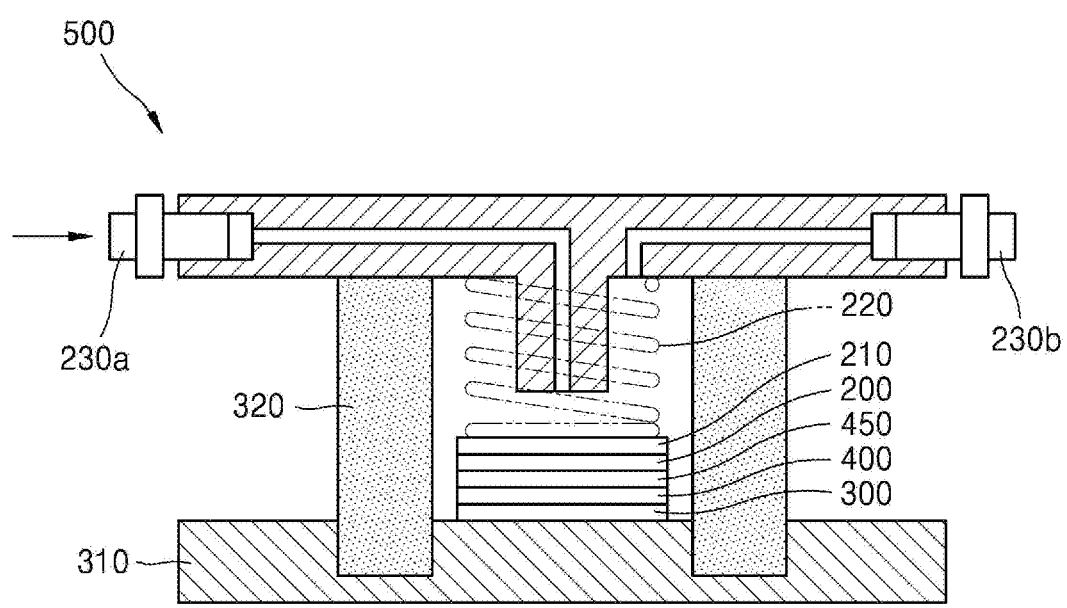
FIG. 5 is a schematic view illustrating an embodiment of a structure of a lithium-air battery.

FIG. 5 is a schematic view illustrating a structure of a lithium-air battery 500 according to an embodiment. Referring to FIG. 5, the lithium-air battery 500 according to an embodiment may include a cathode 200 adjacent to a first current collector 210 and using oxygen as an active material, an anode 300 adjacent to a second current collector 310 and including lithium, and an first electrolyte membrane 400 interposed between the cathode 200 and the anode 300. The first electrolyte membrane 400 may be a separator impregnated with a liquid electrolyte. A second electrolyte membrane 450 may be arranged between the cathode 200 and the first electrolyte membrane 400. The second electrolyte membrane 450 may be a lithium-ion conductive solid electrolyte membrane. The first current collector 210 may be porous and function as a gas diffusion layer which allows diffusion of air. A pressing member 220 for transporting air to the cathode 200 may be arranged on the first current collector 210. A case 320 made of an insulating resin may be disposed between the cathode 200 and the anode 300 to electrically insulate the cathode 200 and the anode 300 from one another. The air may be supplied into the lithium-air battery 500 through an air inlet 230a and may be discharged through an air outlet 230b. The lithium-air battery 500 may be accommodated in a stainless steel container.

The term "air" used herein is not limited to atmospheric air, and for convenience, may refer to a combination of gases including oxygen, or pure oxygen gas. This broad definition of the term "air" also applies to other terms used herein, including "air battery" and "air electrode."

According to an aspect of the disclosure, a method of preparing the mixed conductor according to an embodiment includes: mixing an A-element precursor, e.g., an A-element containing precursor, and an M-element precursor, e.g., an M-element containing precursor, to prepare a mixture; and reacting the mixture in a solid phase to thereby prepare the mixed conductor. Due to the preparation of the mixed conductor through the solid state reaction, it may be possible to produce the mixed conductor on a mass scale.

In the preparation of the mixture, for example, the A-element precursor and the M-element precursor may be mixed in an organic solvent, an aqueous solution, or a combination thereof with a ball mill. The organic solvent may be alcohol such as 2-propanol. However, the disclosed embodiment is not limited thereto. Any suitable solvent may be used. The reacting of the mixture in a solid phase may mean that the reaction proceeds, for example, by heat treatment in the absence of a solvent.

For example, the prepared mixed conductor may be represented by Formula 1.

$$A_{1\pm x}M_{2\pm y}O_{4-\delta} \quad \text{Formula 1}$$

In Formula 1, A may be a monovalent cation, and M may be at least one of a monovalent cation, a divalent cation, a trivalent cation, a tetravalent cation, a pentavalent cation, or a hexavalent cation, $\delta$ denotes oxygen vacancy, $0 \le x \le 1$, $0 \le y \le 2$, and $0 \le \delta \le 1$, and when M is vanadium (V), $0 < \delta$.

In the method according to an embodiment, the A-element precursor may be, for example, a salt or an oxide of A, and the M-element precursor may be, for example, a salt or an oxide of M.

For example, the A-element precursor may be a lithium precursor. The lithium precursor may be, for example, $Li_2CO_3$, $LiNO_3$, $LiNO_2$, $LiOH$, $LiOH \cdot nH_2O$, $LiH$, $LiF$, $LiCl$, $LiBr$, $LiI$, $CH_3OOLi$, $Li_2O$, $Li_2SO_4$, lithium dicarboxylate, lithium citrate, lithium fatty acid, or alkyl lithium. However, the disclosed embodiment is not limited thereto. Any suitable lithium precursor may be used.

The M-element precursor may be, for example, a precursor of at least one metal of Co, Ni, Fe, Mn, V, Ti, Cr, Cu, Zn, Mo, Ru, Nb, Ta, Pd, Ag, Mg, Ca, Sr, Sc, Y, La, Ce, Pr, Nd, Sm, Eu, Gd, Tb, Dy, Ho, Er, Tm, Yb, Lu, Zr, Hf, Nb, Ta, W, Tc, Re, Ru, Os, Rh, Ir, Pd, Pt, Au, Cd, Hg, Al, Ga, In, TI, Ge, Sn, Pb, Sb, Bi, Po, As, Se, or Te. For example, the M-element precursor may be at least one of a Co precursor, a Ni precursor, a Fe precursor, a Mn precursor, or a V precursor. The Co precursor may be, for example, $CoO$, $Co_2O_3$, $Co_3O_4$, $CoF_2$, $Co(OCH_3)_2$, $CoCl_2$, or the like. However, the disclosed embodiment is not limited thereto. Any suitable Co precursor may be used. The Ni precursor may be, for example, $NiO$, $Ni_2O_3$, $NiF_2$, $NiCl_2$, $NiBr_2$, or $Ni(OCH_3)_2$. However, the disclosed embodiment is not limited thereto. Any suitable Ni precursor may be used. The Fe precursor may be, for example, $FeCl_3$, $FeF_3$, $Fe(NO_3)_3$, $FeSO_4$, $FeO$, or $Fe_2O_3$. However, the disclosed embodiment is not limited thereto. Any suitable Fe precursor may be used. The Mn precursor may be, for example, $Mn(NO_3)_2$, $MnSO_4$, $MnO$, $Mn_2O_3$, $MnCl_2$, or $MnF_2$. However, the disclosed embodiment is not limited thereto. Any suitable Mn precursor may be used. The V precursor may be, for example, $VO(NO_3)_3$, $VOSO_4$, $V_2O_5$, $VCl_2$, $VCl_3$, or $VF_3$. However, the disclosed embodiment is not limited thereto. Any suitable V precursor may be used.

In the mixed conductor preparation method according to an embodiment, the preparing of the mixed conductor by reacting the mixture in a solid phase may include: performing first thermal treatment on the mixture under a dry and oxidizing condition to prepare a first thermal treatment product; grinding and pressing the first thermal treatment product to thereby prepare pellets; and performing second thermal treatment on the pellets under a) a reducing condition, b) an oxidizing condition, or c) an oxidizing and reducing condition.

In the second thermal treatment, a) the reducing condition, b) the oxidizing condition, or c) the oxidizing and reducing condition may be appropriately selected according to the oxidation number of a metal in the mixed conductor to be prepared.

The a) reducing condition may be a condition including a reducing gas. The reducing gas may be, for example, hydrogen ($H_2$). However, the disclosed embodiment is not limited thereto. Any suitable reducing gas may be used. The reducing condition may include a mixture of a reducing gas and an inert gas. The inert gas may be, for example, nitrogen, argon, or the like. However, the disclosed embodiment is not limited thereto. Any suitable inert gas may be used. In the reducing condition, an amount of the reducing gas may be, for example, about 1% to about 99%, about 2% to about 50%, or about 5% to about 20%, each based on a total volume of the entire gas. Due to the thermal treatment under such a reducing condition, oxygen vacancies may be introduced into the mixed conductor.

The b) oxidizing condition may be a condition including an oxidizing gas. The oxidizing gas may be, for example, oxygen or air. However, the disclosed embodiment is not limited thereto. Any suitable oxidizing gas may be used. The oxidizing condition may include a mixture of an oxidizing gas and an inert gas. The inert gas may be the same as that used in the above-described reducing atmosphere.

The second thermal treatment under c) an oxidizing and reducing condition may refer to a second thermal treatment in which thermal treatment is sequentially performed under an oxidizing condition and then under a reducing condition. The oxidizing and reducing condition may be the same as a combination of a) the oxidizing condition and b) the reducing condition each described above.

The first thermal treatment may be performed, for example, at a temperature of about 400 ° C. to about 1,000 ° C., about 450 ° C. to about 900 ° C., about 500 ° C. to about 800 ° C., or about 500 ° C. to about 750 ° C. The first thermal treatment time may be, for example, about 2 hours to about 10 hours, about 3 hours to about 9 hours, about 4 hours to about 8 hours, or about 4 hours to about 6 hours. The second thermal treatment may be performed, for example, at a temperature of about 400 ° C. to about 1200 ° C., about 500 ° C. to about 1100 ° C., about 600 ° C. to about 1,000 ° C., or about 600 ° C. to about 900 ° C. The second thermal treatment time may be, for example, about 4 hours to about 48 hours, for example, about 6 hours to about 40 hours, about 8 hours to about 30 hours, or about 10 hours to about 20 hours. Due to the first thermal treatment and the second thermal treatment performed under such conditions as described above, the prepared mixed conductor may have further improved electrochemical stability.

An embodiment of the present disclosure will now be described in further detail with reference to the following examples. However, these examples are only for illustrative purposes and are not intended to limit the scope of the disclosed embodiment.

EXAMPLES

Preparation of Mixed Conductor

Example 1: $LiFe_2O_4$ $Li_2CO_3$ as a lithium precursor and $Fe_2O_3$ as an iron precursor were mixed in a stoichiometric ratio, and then mixed with ethanol, followed by grinding and mixing a resulting mixture with a ball mill including zirconia balls at about 280 rpm for about 4 hours to thereby obtain a mixture. The obtained mixture was dried at about 90 ° C. for about 6 hours, and then thermally treated under an air atmosphere at about 750 ° C. for about 5 hours (first thermal treatment). A first thermal treatment product was ground using a ball mill and then pressed under isostatic pressure to thereby prepare pellets. The prepared pellets were subjected to second thermal treatment at about 900 ° C. under an air atmosphere for about 12 hours to thereby prepare a mixed conductor ($LiFe_2O_4$).

Example 2: $LiFeCoO_4$ $Li_2CO_3$ as a lithium precursor, $Fe_2O_3$ as an iron precursor, and $Co_3O_4$ as a cobalt precursor were mixed in a stoichiometric ratio, and then mixed with ethanol, followed by grinding and mixing a resulting mixture with a ball mill including zirconia balls at about 280 rpm for about 4 hours to thereby obtain a mixture. The obtained mixture was dried at about 90 ° C. for about 6 hours, and then thermally treated under an air atmosphere at about 750 ° C. for about 5 hours (first thermal treatment). A first thermal treatment product was ground using a ball mill and then pressed under isostatic pressure to thereby prepare pellets. The prepared pellets were subjected to second thermal treatment at about 900 ° C. under an air atmosphere for about 12 hours to thereby prepare a mixed conductor ($LiFeCoO_4$).

Example 3: $LiVNiO_{4-\delta}$ $Li_2CO_3$ as a lithium precursor, $V_2O_3$ as a vanadium precursor, and $Ni(OH)_2$ as a nickel precursor were mixed in a stoichiometric ratio, and then mixed with ethanol, followed by grinding and mixing a resulting mixture with a ball mill including zirconia balls at about 280 rpm for about 4 hours to thereby obtain a mixture. The obtained mixture was dried at about 90 ° C. for about 6 hours, and then thermally treated under an air atmosphere at about 500 ° C. for about 5 hours (first thermal treatment). A first thermal treatment product was ground using a ball mill and then pressed under isostatic pressure to thereby prepare pellets. The prepared pellets were subjected to second thermal treatment at about 600 ° C. under an air atmosphere for about 12 hours to thereby prepare a mixed conductor ($LiVNiO_{4-\delta}$, wherein $0<\delta$).

Comparative Example 1: $Li_4Ti_5O_{12}$

Commercially purchased $Li_4Ti_5O_{12}$ powder was pressed under an isostatic pressure, as described in Example 1, to thereby prepare pellets.

Evaluation Example 1: X-ray Diffraction ("XRD") Evaluation

X-ray diffraction ("XRD") spectra of the mixed conductor of Examples 1 to 3 were evaluated. The results are shown in FIG. 1. The XRD spectra were obtained with Cu Kα radiation.

Referring to FIG. 1, the mixed conductors of Examples 1 to 3 each exhibited peak corresponding to the (220) plane of the inverse spinel crystal structure at a diffraction angle 2θ of 31°±2.0° 2θ.

The peak at a diffraction angle 2θ of 31°±2.0° 2θ is a peak originating from an element located in a tetrahedral site of a normal spinel crystal structure. This peak does not appear when Li is in the tetrahedral site, but appears when a metal except for Li is located in the tetrahedral site. Accordingly, as shown in FIG. 1, the mixed conductors of Examples 1 to 3 each had an inverse spinel crystal structure with a non-lithium metal in the tetrahedral site of the spinel crystal structure.

On the contrary, in an XRD spectrum of the $Li_4Ti_5O_{12}$ conductor of Comparative Example 1, a diffraction peak corresponding to the (220) plane of the inverse spinel crystal structure did not appear at a diffraction angle 2θ of 31°±2.0° 2θ, but only a peak corresponding to the normal spinel crystal structure appeared. Accordingly, the $Li_4Ti_5O_{12}$ conductor of Comparative Example 1 had a normal spinel crystal structure with only lithium in the tetrahedral site of the spinel crystal structure.

Through further structure analysis, the mixed conductors of Examples 1 to 3 each having the inverse spinel crystal structure had oxidation numbers and compositions represented by $[Fe^{3+}]_{tet}[Li^+Fe^{4+}]_{oct}O_4$, $[Fe^{3+}]_{tet}[Li^+Co^{4+}]_{oct}O_4$, and $[V^{5+}]_{tet}[Li^+Ni^{2+}]_{oct}O_{4-\delta}$, respectively, wherein $[\ ]_{tet}$ denotes the tetrahedral site in the spinel crystal structure, and $[\ ]_{oct}$ denotes the octahedral site in the spinel crystal structure.

Evaluation Example 2: Evaluation of Electronic Conductivity

Ion-blocking cells were manufactured by sputtering gold (Au) onto opposite surfaces of each of the mixed conductors in pellets prepared in Examples 1 to 3 and Comparative Preparation Example 1, and then electronic conductivities of the ion-blocking cells were measured using a direct current ("DC") polarization method at room temperature (25 ° C.).

While applying a constant voltage of about 100 mV to each of the completed symmetric cells for about 30 minutes, a time-dependent current of the cell was measured. An electronic resistance of each of the mixed conductors was calculated from the measured current, and an electronic conductivity was calculated from the calculated electronic resistance. The obtained electronic conductivities are shown in Table 1.

Evaluation Example 3: Evaluation of Ionic Conductivity

Electron-blocking cells were manufactured by arranging liquid electrolyte (1 molar (M) lithium bis(trifluoromethanesulfonyl)imide (LiTFSI) in propylene carbonate ("PC"))-impregnated separator membranes on opposite surfaces of each of the mixed conductors in pellets prepared in Examples 1 to 3 and Comparative Example 1, and then arranging lithium foils thereon. Next, ionic conductivities of the electron-blocking cells were measured using a DC polarization method at room temperature (25 ° C.).

While applying a constant voltage of about 100 millivolts (mV) to each of the completed symmetric cells for about 30 minutes, a time-dependent current of the cell was measured. An ionic resistance of each of the mixed conductors was calculated from the measured current, and an ionic conductivity was calculated from the calculated ionic resistance. The obtained ionic conductivities are shown in Table 1.

TABLE 1

| Example | Composition | Electronic conductivity (Siemens percentimeter (S/cm)) | Ionic conductivity (S/cm) |
| --- | --- | --- | --- |
| Comparative Example 1 | $Li_4Ti_5O_{12}$ | $4.3 \times 10^{-9}$ | $6.8 \times 10^{-8}$ |
| Example 1 | $LiFe_2O_4$ | $1.32 \times 10^{-6}$ | $6.49 \times 10^{-6}$ |
| Example 2 | $LiFeCoO_4$ | $2.14 \times 10^{-6}$ | $4.72 \times 10^{-6}$ |
| Example 3 | $LiVNiO_{4-\delta}$ | $1.56 \times 10^{-7}$ | $7.50 \times 10^{-7}$ |

Referring to Table 1, the mixed conductors of Examples 1 to 3 with an inverse spinel crystal structure each had improved electronic conductivity and ionic conductivity at the same time, as compared with the $Li_4Ti_5O_{12}$ conductor of Comparative Example 1 with the normal spinel crystal structure.

The mixed conductors of Examples 1 to 3 each had an ionic conductivity greater than an electronic conductivity.

Evaluation Example 4: Evaluation of Electronic Band Structure

The electronic band structures of the $Li_4Ti_5O_{12}$ conductor of Comparative Example 1 and the mixed conductor ($LiFe_2O_4$) of Example 1 were calculated, and band gaps were evaluated from the calculation results.

The electronic band structures were calculated using the Vienna ab-initio simulation program ("VASP") with the framework of density functional theory ("DFT"). The calculation results of the $Li_4Ti_5O_{12}$ conductor of Comparative Example 1 are shown in FIG. 2

Figure 2:
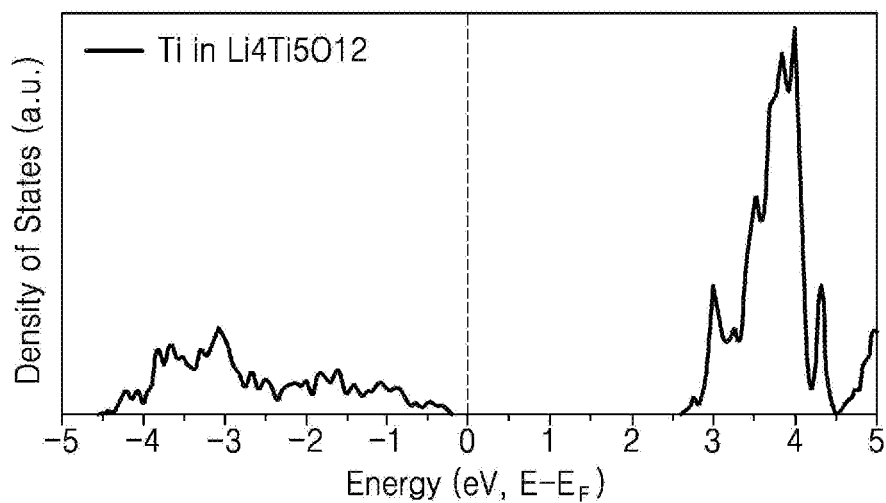
FIG. 2 is a graph of Density of States versus Energy (electron volts, eV) illustrating the results of density of states ("DOS") analysis of a $Li_4Ti_5O_{12}$ conductor of Comparative Example 1.

Referring to FIG. 2, the conductor of Comparative Example 1 had a band gap of about 2.5 electron volts (eV). The mixed conductors of Examples 1 to 3 each had a band gap of about 2.0 volts (V) or less.

That is, the mixed conductors of Examples 1 to 3 with an inverse spinel crystal structure each had a smaller band gap, as compared with the $Li_4Ti_5O_{12}$ conductor of Comparative Example 1 with the normal spinel crystal structure, and thus have improved electronic conductivity.

Evaluation Example 5: Evaluation of Lithium Transition Activation Energy

Figure 3:
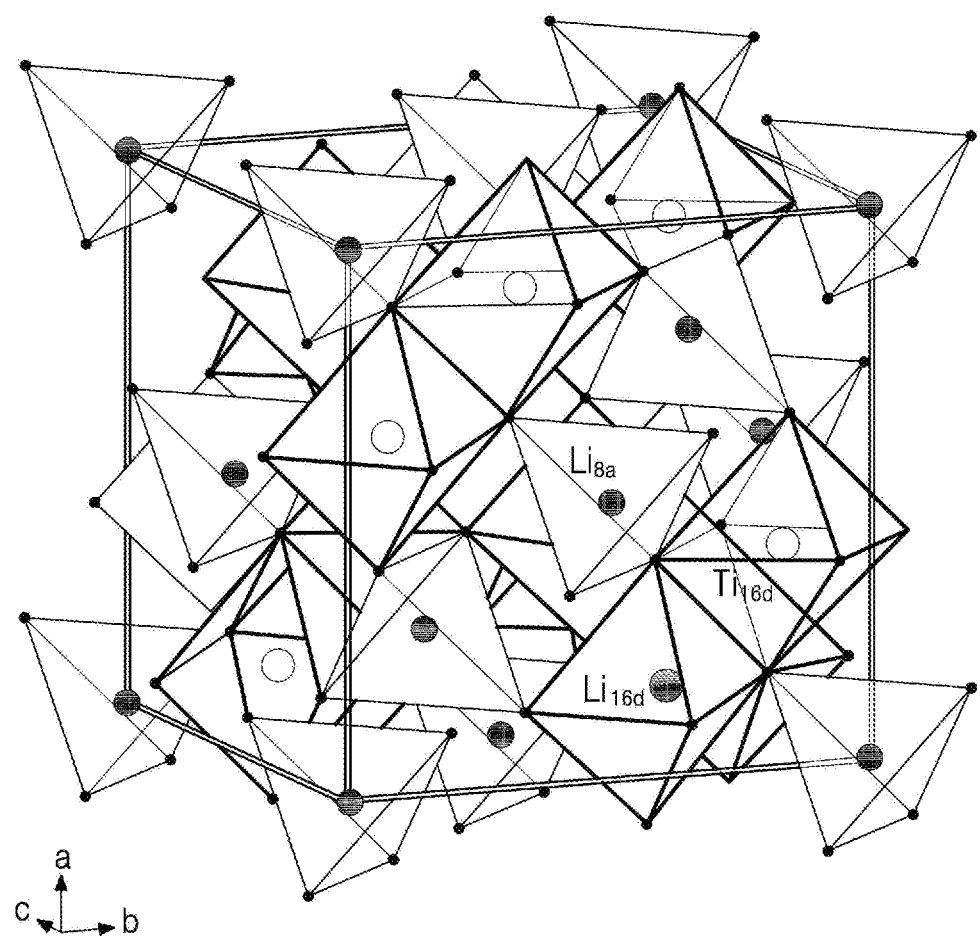
FIG. 3 is a schematic view illustrating a spinel crystal structure of $Li_4Ti_5O_{12}$.

As shown in FIG. 3, in the $Li_4Ti_5O_{12}$ conductor of Comparative Example 1 with the normal spinel crystal structure, lithium occupied tetrahedral 8a site s and octahedral 16d sites of a spinel-like crystal structure. Further, a face sharing octahedral 16c siteis disposed between two adjacent tetrahedral 8a sites. Lithium conduction characteristics are attributed to, for example, transition of lithium from a tetrahedral 8a siteto another tetrahedral 8a sitevia an octahedral 16c site .

As illustrated in FIG. 4, in the mixed conductor $LiFe_2O_4$ of Example 1 with an inverse spinel crystal structure, lithium occupied octahedral 16d sites of the inverse spinel crystal structure, with a face sharing tetrahedral 8b site between two adjacent octahedral 16d sites. Lithium conduction characteristics are attributed to, for example, a lithium transition from an octahedral 16d site to another octahedral 16d site via a tetrahedral 8b site. In FIG. 4, M denotes a transition metal, i.e., iron (Fe).

A lithium transition activation energy of the $Li_4Ti_5O_{12}$ conductor of Comparative Example 1 when lithium transitions from a tetrahedral 8a siteto another tetrahedral 8a site via an octahedral 16c sitewas calculated.

A lithium transition activation energy of the mixed conductor ($LiFe_2O_4$) of Example 1 when lithium transitions from an octahedral 16d site to another octahedral 16d site via a tetrahedral 8b site was calculated.

The lithium transition activation energies were calculated using the Vienna abinitio simulation program ("VASP") with the framework of density functional theory ("DFT").

The activation energy (Ea, 8a->16c->8a, i.e., energy barrier) of the $Li_4Ti_5O_{12}$ conductor of Comparative Example 1 with the normal spinel crystal structure when lithium transition or lithium diffusion occurs from a tetrahedral 8a siteto another tetrahedral 8a sitevia an octahedral 16c sitewas about 0.7 eV or greater.

The activation energy (Ea, 16d->8b->16d, i.e., energy barrier) of the mixed conductor ($LiFe_2O_4$) of Example 1 with an inverse spinel crystal structure when a lithium transition or a lithium diffusion occurs from an octahedral 16d site from another octahedral 16d site via a tetrahedral 8b site was about 0.6 eV or less.

Referring to Table 1 above, the mixed conductors of Examples 1 to 3 with an inverse spinel crystal structure each exhibited improved ionic conductivity, as compared with the $Li_4Ti_5O_{12}$ conductor of Comparative Example 1.

Accordingly, a mixed conductor having an inverse spinel crystal structure according to an embodiment has a decreased energy barrier when lithium transition or lithium diffusion occurs, and improved ionic conductivity.

As described above, according to an embodiment, by using a mixed conductor which may be chemically stable and conduct both ions and electrons, deterioration of an electrochemical device may be suppressed.

It should be understood that the embodiment described herein should be considered in a descriptive sense only and not for purposes of limitation. Descriptions of features or aspects within this embodiment should be considered as available for other similar features or aspects.

While an embodiment has been described with reference to the figures, it will be understood by those of ordinary skill in the art that various changes in form and details may be made therein without departing from the spirit and scope as defined by the following claims.

What is claimed is:

1. A mixed conductor represented by Formula 1:

$$A_{1\pm x}M_{2\pm y}O_{4-\delta} \quad \text{Formula 1}$$

wherein, in Formula 1,
A is a monovalent cation,
M is at least one of a monovalent cation, a divalent cation, a trivalent cation, a tetravalent cation, a pentavalent cation, or a hexavalent cation,
$0 \leq x \leq 1$, $0 \leq y \leq 2$, and
$0 \leq \delta \leq 1$, with the proviso that when M includes vanadium, $0 < \delta \leq 1$, and
wherein the mixed conductor has an inverse spinel crystal structure.

2. The mixed conductor of claim 1, wherein A in Formula 1 is a monovalent alkali metal cation.

3. The mixed conductor of claim 2, wherein A is at least one of Li, Na, or K.

4. The mixed conductor of claim 1, wherein M is at least one of Co, Ni, Fe, Mn, V, Ti, Cr, Cu, Zn, Mo, Ru, Nb, Ta, Pd, Ag, Mg, Ca, Sr, Sc, Y, La, Ce, Pr, Nd, Sm, Eu, Gd, Tb, Dy, Ho, Er, Tm, Yb, Lu, Zr, Hf, Nb, Ta, W, Tc, Re, Ru, Os, Rh, Ir, Pd, Pt, Au, Cd, Hg, Al, Ga, In, Tl, Ge, Sn, Pb, Sb, Bi, Po, As, Se, or Te.

5. The mixed conductor of claim 1, wherein in Formula 1
A is Li, and
M is at least one of Co, Ni, Fe, Mn, V, Ti, Cr, Cu, Zn, Mo, Ru, Nb, Ta, Pd, Ag, Mg, Ca, Sr, Sc, Y, La, Ce, Pr, Nd, Sm, Eu, Gd, Tb, Dy, Ho, Er, Tm, Yb, Lu, Zr, Hf, Nb, Ta, W, Tc, Re, Ru, Os, Rh, Ir, Pd, Pt, Au, Cd, Hg, Al, Ga, In, Tl, Ge, Sn, Pb, Sb, Bi, Po, As, Se, or Te.

6. The mixed conductor of claim 1, wherein M is located in both a tetrahedral site and in an octahedral site of the inverse spinel crystal structure.

7. The mixed conductor of claim 6, wherein the M in the tetrahedral site belongs to a high spin system including three or more unpaired electrons in a d-orbital.

8. The mixed conductor of claim 6, wherein the M in the tetrahedral site is at least one of Fe, V, Co, Ni, Mn, Ti, Cr, Cu, Zn, Mo, Ru, Nb, Ta, Pd, or Ag.

9. The mixed conductor of claim 6, wherein the M in the tetrahedral site and the M in the octahedral site have different oxidation numbers.

10. The mixed conductor of claim 6, wherein the mixed conductor is at least one of:

$Li_{1\pm x}Fe_{2\pm y}O_{4-\delta}$ wherein $0 \leq x \leq 0.5$, $0 \leq y \leq 1$, and $0 \leq \delta \leq 0.5$, $Li_{1\pm x}Ni_{2\pm y}O_{4-\delta}$ wherein $0 \leq x \leq 0.5$, $0 \leq y \leq 1$, and $0 \leq \delta \leq 0.5$, $Li_{1\pm x}Co_{2\pm y}O_{4-\delta}$ wherein $0 \leq x \leq 0.5$, $0 \leq y \leq 1$, and $0 \leq \delta \leq 0.5$, $Li_{1\pm x}Mn_{2\pm y}O_{4-\delta}$ wherein $0 \leq x \leq 0.5$, $0 \leq y \leq 1$, and $0 \leq \delta \leq 0.5$, $L_{1\pm x}V_{2\pm y}O_{4-\delta}$ wherein $0 \leq x \leq 0.5$, $0 \leq y \leq 1$, and $0 \leq \delta \leq 0.5$, $Li_{1\pm x}Ti_{2\pm y}O_{4-\delta}$ wherein $0 \leq x \leq 0.5$, $0 \leq y \leq 1$, and $0 \leq \delta \leq 0.5$, $L_{1\pm x}Cr_{2\pm y}O_{4-\delta}$ wherein $0 \leq x \leq 0.5$, $0 \leq y \leq 1$, and $0 \leq \delta \leq 0.5$, $Li_{1\pm x}Cu_{2\pm y}O_{4-\delta}$ wherein $0 \leq x \leq 0.5$, $0 \leq y \leq 1$, and $0 \leq \delta \leq 0.5$, $Li_{1\pm x}Zn_{2\pm y}O_{4-\delta}$ wherein $0 \leq x \leq 0.5$, $0 \leq y \leq 1$, and $0 \leq \delta \leq 0.5$, $Li_{1\pm x}Mo_{2\pm y}O_{4-\delta}$ wherein $0 \leq x \leq 0.5$, $0 \leq y \leq 1$, and $0 \leq \delta \leq 0.5$, $Li_{1\pm x}Ru_{2\pm y}O_{4-\delta}$ wherein $0 \leq x \leq 0.5$, $0 \leq y \leq 1$, and $0 \leq \delta \leq 0.5$, $Li_{1\pm x}Nb_{2\pm y}O_{4-\delta}$ wherein $0 \leq x \leq 0.5$, $0 \leq y \leq 1$, and $0 \leq \delta \leq 0.5$, $Li_{1\pm x}Ta_{2\pm y}O_{4-\delta}$ wherein $0 \leq x \leq 0.5$, $0 \leq y \leq 1$, and $0 \leq \delta \leq 0.5$, $Li_{1\pm x}Pd_{2\pm y}O_{4-\delta}$ wherein $0 \leq x \leq 0.5$, $0 \leq y \leq 1$, and $0 \leq \delta \leq 0.5$, $Li_{1\pm x}Ag_{2\pm y}O_{4-\delta}$ wherein $0 \leq x \leq 0.5$, $0 \leq y \leq 1$, and $0 \leq \delta \leq 0.5$, $Li_{1\pm x}Zr_{2\pm y}O_{4-\delta}$ wherein $0 \leq x \leq 0.5$, $0 \leq y \leq 1$, and $0 \leq \delta \leq 0.5$, $Li_{1\pm x}Hf_{2\pm y}O_{4-\delta}$ wherein $0 \leq x \leq 0.5$, $0 \leq y \leq 1$, and $0 \leq \delta \leq 0.5$, $Li_{1\pm x}Nb_{2\pm y}O_{4-\delta}$ wherein $0 \leq x \leq 0.5$, $0 \leq y \leq 1$, and $0 \leq \delta \leq 0.5$, $Li_{1\pm x}Ta_{2\pm y}O_{4-\delta}$ wherein $0 \leq x \leq 0.5$, $0 \leq y \leq 1$, and $0 \leq \delta \leq 0.5$, $Li_{1\pm x}W_{2\pm y}O_{4-\delta}$ wherein $0 \leq x \leq 0.5$, $0 \leq y \leq 1$, and $0 \leq \delta \leq 0.5$, $Li_{1\pm x}Tc_{2\pm y}O_{4-\delta}$ wherein $0 \leq x \leq 0.5$ $0 \leq y \leq 1$, and $0 \leq \delta \leq 0.5$, $Li_{1\pm x}Re_{2\pm y}O_{4-\delta}$ wherein $0 \leq x \leq 0.5$, $0 \leq y \leq 1$, and $0 \leq \delta \leq 0.5$, $Li_{1\pm x}Ru_{2\pm y}O_{4-\delta}$ wherein $0 \leq x \leq 0.5$, $0 \leq y \leq 1$, and $0 \leq \delta \leq 0.5$, $Li_{1\pm x}Os_{2\pm y}O_{4-\delta}$ wherein $0 \leq x \leq 0.5$, $0 \leq y \leq 1$, and $0 \leq \delta \leq 0.5$, $Li_{1\pm x}Rh_{2\pm y}O_{4-\delta}$ wherein $0 \leq x \leq 0.5$, $0 \leq y \leq 1$, and $0 \leq \delta \leq 0.5$, $Li_{1\pm x}Ir_{2\pm y}O_{4-\delta}$ wherein $0 \leq x \leq 0.5$, $0 \leq y \leq 1$, and $0 \leq \delta \leq 0.5$, $L_{1\pm x}Pd_{2\pm y}O_{4-\delta}$ wherein $0 \leq x \leq 0.5$, $0 \leq y \leq 1$, and $0 \leq \delta \leq 0.5$, $Li_{1\pm x}Pt_{2\pm y}O_{4-\delta}$ wherein $0 \leq x \leq 0.5$, $0 \leq y \leq 1$, and $0 \leq \delta \leq 0.5$, $Li_{1\pm x}Au_{2\pm y}O_{4-\delta}$ wherein $0 \leq x \leq 0.5$, $0 \leq y \leq 1$, and $0 \leq \delta \leq 0.5$, $Li_{1\pm x}Cd_{2\pm y}O_{4-\delta}$ wherein $0 \leq x \leq 0.5$, $0 \leq y \leq 1$, and $0 \leq \delta \leq 0.5$, $Li_{1\pm x}Hg_{2\pm y}O_{4-\delta}$ wherein $0 \leq x \leq 0.5$, $0 \leq y \leq 1$, and $0 \leq \delta \leq 0.5$, $Li_{1\pm x}Al_{2\pm 4}O_{4-\delta}$ wherein $0 \leq x \leq 0.5$, $0 \leq y \leq 1$, and $0 \leq \delta \leq 0.5$, $Li_{1\pm x}Ga_{2\pm y}O_{4-\delta}$ wherein $0 \leq x \leq 0.5$, $0 \leq y \leq 1$, and $0 \leq \delta \leq 0.5$, $Li_{1\pm x}In_{2\pm y}O_{4-\delta}$ wherein $0 \leq x \leq 0.5$, $0 \leq y \leq 1$, and $0 \leq \delta \leq 0.5$, $Li_{1\pm x}Tl_{2\pm y}O_{4-\delta}$ wherein $0 \leq x \leq 0.5$, $0 \leq y \leq 1$, and $0 \leq \delta \leq 0.5$, $Li_{1\pm x}Ge_{2\pm y}O_{4-\delta}$ wherein $0 \leq x \leq 0.5$, $0 \leq y \leq 1$, and $0 \leq \delta \leq 0.5$, $Li_{1\pm x}Sn_{2\pm y}O_{4-\delta}$ wherein $0 \leq x \leq 0.5$, $0 \leq y \leq 1$, and $0 \leq \delta \leq 0.5$, $Li_{1\pm x}Pb_{2\pm y}O_{4-\delta}$ wherein $0 \leq x \leq 0.5$, $0 \leq y \leq 1$, and $0 \leq \delta \leq 0.5$, $Li_{1\pm x}Sb_{2\pm y}O_{4-\delta}$ wherein $0 \leq x \leq 0.5$, $0 \leq y \leq 1$, and $0 \leq \delta \leq 0.5$, $Li_{1\pm x}Bi_{2\pm y}O_{4-\delta}$ wherein $0 \leq x \leq 0.5$, $0 \leq y \leq 1$, and $0 \leq \delta \leq 0.5$, $Li_{1\pm x}Po_{2\pm y}O_{4-\delta}$ wherein $0 \leq x \leq 0.5$, $0 \leq y \leq 1$, and $0 \leq \delta \leq 0.5$, $Li_{1\pm x}As_{2\pm y}O_{4-\delta}$ wherein $0 \leq x \leq 0.5$, $0 \leq y \leq 1$, and $0 \leq \delta \leq 0.5$, $Li_{1\pm x}Fe_{1\pm a}Co_{1\pm b}O_{4-\delta}$ wherein $0 \leq x \leq 0.5$, $0 \leq a \leq 0.5$, $0 \leq b \leq 0.5$, $0 \leq a+b \leq 1$, and $\delta \leq 0.5$, $Li_{1\pm x}Fe_{1\pm a}Ni_{1\pm b}O_{4-\delta}$ wherein $0 \leq x \leq 0.5$, $0 \leq a \leq 0.5$, $0 \leq b \leq 0.5$, $0 \leq a+b \leq 1$, and $\delta \leq 0.5$, $Li_{1\pm x}Fe_{1\pm a}Mn_{1\pm b}O_{4-\delta}$ wherein $0 \leq x \leq 0.5$, $0 \leq a \leq 0.5$, $0 \leq b \leq 0.5$, $0 \leq a+b \leq 1$, and $\delta \leq 0.5$, $Li_{1\pm x}Fe_{1\pm a}V_{1\pm b}O_{4-\delta}$ wherein $0 \leq x \leq 0.5$, $0 \leq a \leq 0.5$, $0 \leq b \leq 0.5$, $0 \leq a+b \leq 1$, and $\delta \leq 0.5$, $Li_{1\pm x}Fe_{1\pm a}Ti_{1\pm b}O_{4-\delta}$ wherein $0 \leq x \leq 0.5$, $0 \leq a \leq 0.5$, $0 \leq b \leq 0.5$, $0 \leq a+b \leq 1$, and $\delta \leq 0.5$, $Li_{1\pm x}Fe_{1\pm a}Cr_{1\pm b}O_{4-\delta}$ wherein $0 \leq x \leq 0.5$, $0 \leq a \leq 0.5$, $0 \leq b \leq 0.5$, $0 \leq a+b \leq 1$, and $\delta \leq 0.5$, $Li_{1\pm x}Fe_{1\pm a}Cu_{1\pm b}O_{4-\delta}$ wherein $0 \leq x \leq 0.5$, $0 \leq a \leq 0.5$, $0 \leq b \leq 0.5$, $0 \leq a+b \leq 1$, and $\delta \leq 0.5$, $Li_{1\pm x}Fe_{1\pm a}Zn_{1\pm b}O_{4-\delta}$ wherein $0 \leq x \leq 0.5$, $0 \leq a \leq 0.5$, $0 \leq b \leq 0.5$, $0 \leq a+b \leq 1$, and $\delta \leq 0.5$, $Li_{1\pm x}Fe_{1\pm a}Mo_{1\pm b}O_{4-\delta}$ wherein $0 \leq x \leq 0.5$, $0 \leq a \leq 0.5$, $0 \leq b \leq 0.5$, $0 \leq a+b \leq 1$, and $\delta \leq 0.5$, $Li_{1\pm x}Fe_{1\pm a}Ru_{1\pm b}O_{4-\delta}$ wherein $0 \leq x \leq 0.5$, $0 \leq a \leq 0.5$, $0 \leq b \leq 0.5$, $0 \leq a+b \leq 1$, and $\delta \leq 0.5$, $Li_{1\pm x}Fe_{1\pm a}Nb_{1\pm b}O_{4-\delta}$ wherein $0 \leq x \leq 0.5$, $0 \leq a \leq 0.5$, $0 \leq b \leq 0.5$, $0 \leq a+b \leq 1$, and $\delta \leq 0.5$, $Li_{1\pm x}Fe_{1\pm a}Ta_{1\pm b}O_{4-\delta}$ wherein $0 \leq x \leq 0.5$, $0 \leq a \leq 0.5$, $0 \leq b \leq 0.5$, $0 \leq a+b \leq 1$, and $\delta \leq 0.5$, $Li_{1\pm x}Fe_{1\pm a}Pd_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Fe_{1 \pm a}Ag_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}V_{1 \pm a}Fe_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}V_{1 \pm a}Co_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}V_{1 \pm a}Ni_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}V_{1 \pm a}Mn_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}V_{1 \pm a}Ti_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}V_{1 \pm a}Cr_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}V_{1 \pm a}Cu_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}V_{1 \pm a}Zn_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}V_{1 \pm a}Mo_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{a \pm x}V_{1 \pm a}Ru_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}V_{1 \pm a}Nb_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}V_{1 \pm a}Ta_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}V_{1 \pm a}Pd_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}V_{1 \pm a}Ag_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Co_{1 \pm a}Fe_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Co_{1 \pm a}Mn_{1 \pm b}O_{4-\delta}$ $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Co_{1 \pm a}V_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Co_{1 \pm a}Ti_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Co_{1 \pm a}Cr_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}C_{1 \pm a}CU_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Co_{1 \pm a}Zn_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Co_{1 \pm a}Mo_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Co_{1 \pm a}Ru_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Co_{1 \pm a}Nb_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Co_{1 \pm a}Ta_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Co_{1 \pm a}Pd_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Co_{1 \pm a}Ag_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ni_{1 \pm a}Co_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ni_{1 \pm a}Fe_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ni_{1 \pm a}Mn_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ni_{1 \pm a}V_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ni_{1 \pm a}Ti_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ni_{1 \pm a}Cr_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ni_{1 \pm a}Cu_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ni_{1 \pm a}Zn_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ni_{1 \pm a}Mo_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ni_{1 \pm a}Ru_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ni_{1 \pm a}Nb_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ni_{1 \pm a}Ta_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ni_{1 \pm a}Pd_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ni_{1 \pm a}Ag_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Mn_{1 \pm a}Co_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Mn_{1 \pm a}Fe_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Mn_{1 \pm a}V_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Mn_{1 \pm a}Ti_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Mn_{1 \pm a}Cr_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Mn_{1 \pm a}Cu_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Mn_{1 \pm a}Zn_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Mn_{1 \pm a}Mo_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Mn_{1 \pm a}Ru_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Mn_{1 \pm a}Nb_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Mn_{1 \pm a}Ta_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Mn_{1 \pm a}Pd_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Mn_{1 \pm a}Ag_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ti_{1 \pm a}Co_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ti_{1 \pm a}Fe_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ti_{1 \pm a}V_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ti_{1 \pm a}Cr_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ti_{1 \pm a}Cu_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ti_{1 \pm a}Zn_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ti_{1 \pm a}Mo_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ti_{1 \pm a}Ru_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ti_{1 \pm a}Nb_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ti_{1 \pm a}Ta_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ti_{1 \pm a}Pd_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Ti_{1 \pm a}Ag_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Cr_{1 \pm a}Co_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Cr_{1 \pm a}Fe_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Cr_{1 \pm a}V_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Cr_{1 \pm a}CU_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Cr_{1 \pm a}Zn_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Cr_{1 \pm a}Mo_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Cr_{1 \pm a}Ru_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Cr_{1 \pm a}Nb_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Cr_{1 \pm a}Ta_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Cr_{1 \pm a}Pd_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1 \pm x}Cr_{1 \pm a}Ag_{1 \pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Cu_{1\pm a}Co_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Cu_{1\pm a}Fe_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Cu_{1\pm a}V_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Cu_{1\pm a}Cr_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Cu_{1\pm a}Zn_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Cu_{1\pm a}Mo_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Cu_{1\pm a}Ru_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Cu_{1\pm a}Nb_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Cu_{1\pm a}Ta_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Cu_{1\pm a}Pd_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Cr_{1\pm a}Ag_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Zn_{1\pm a}Co_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Zn_{1\pm a}Fe_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Zn_{1\pm a}V_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Zn_{1\pm a}Cr_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Zn_{1\pm a}Mo_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Zn_{1\pm a}Ru_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Zn_{1\pm a}Nb_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Zn_{1\pm a}Ta_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Zn_{1\pm a}Pd_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Zn_{1\pm a}Ag_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Mo_{1\pm a}Co_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Mo_{1\pm a}Fe_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Mo_{1\pm a}V_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Mo_{1\pm a}Cr_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Mo_{1\pm a}Ru_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Mo_{1\pm a}Nb_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Mo_{1\pm a}Ta_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Mo_{1\pm a}Pd_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Mo_{1\pm a}Ag_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Ru_{1\pm a}Co_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Ru_{1\pm a}Fe_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}RU_{1\pm a}V_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Ru_{1\pm a}Cr_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Ru_{1\pm a}Nb_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Ru_{1\pm a}Ta_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Ru_{1\pm a}Pd_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Ru_{1\pm a}Ag_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Nb_{1\pm a}Co_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Nb_{1\pm a}Fe_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Nb_{1\pm a}V_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Nb_{1\pm a}Cr_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Nb_{1\pm a}Ta_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Nb_{1\pm a}Pd_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Nb_{1\pm a}Ag_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Ta_{1\pm a}Co_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Ta_{1\pm a}Fe_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Ta_{1\pm a}V_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Ta_{1\pm a}Cr_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Ta_{1\pm a}Pd_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Ta_{1\pm a}Ag_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Pd_{1\pm a}Co_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Pd_{1\pm a}Fe_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Pd_{1\pm a}V_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Pd_{1\pm a}Cr_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Pd_{1\pm a}Ag_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Ag_{1\pm a}Co_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Ag_{1\pm a}Fe_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, $Li_{1\pm x}Ag_{1\pm a}V_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$, or $Li_{1\pm x}Ag_{1\pm a}Cr_{1\pm b}O_{4-\delta}$ wherein $0 \leq x \leq 0.5$, $0 \leq a \leq 0.5$, $0 \leq b \leq 0.5$, $0 \leq a+b \leq 1$, and $\leq \delta \leq 0.5$.

11. The mixed conductor of claim 6, wherein, when analyzed by X-ray diffraction using Cu Kα radiation, the mixed conductor has a diffraction peak corresponding the (220) plane of the inverse spinel crystal structure at about $31° \pm 2.0°$ $2\theta$.

12. The mixed conductor of claim 1, wherein an ionic conductivity of the mixed conductor is greater than an electronic conductivity of the mixed conductor.

13. The mixed conductor of claim 1, wherein the mixed conductor has an electronic conductivity of about $1 \times 10^{-7}$ Siemens per centimeter to about $1 \times 10^{-3}$ Siemens per centimeter at 25° C.

14. The mixed conductor of claim 1, wherein the mixed conductor has an ionic conductivity of about $5 \times 10^{-7}$ Siemens per centimeter to about $1 \times 10^{-3}$ Siemens per centimeter at 25° C.

15. The mixed conductor of claim 1, wherein a band gap between a valence band and a conduction band of the mixed conductor is less than a band gap of $Li_4Ti_5O_{12}$ having a spinel crystal structure.

16. The mixed conductor of claim 15, wherein the band gap between the valence band and the conduction band of the mixed conductor is about 2 electron volts to about 0.1 electron volts.

17. The mixed conductor of claim 1, wherein when A is located in an octahedral 16d site of the inverse spinel crystal structure, and when A is lithium, a lithium transition activation energy for a lithium transition from the octahedral 16d site to another octahedral 16d site via a tetrahedral 8b site in the mixed conductor is less than an activation energy for a lithium transition from an tetrahedral 8a site to another tetrahedral 8*a* site via an octahedral 16*c* site in $Li_4Ti_5O_{12}$ having a spinel crystal structure.

18. The mixed conductor of claim 1, wherein the mixed conductor has an electronic conductivity of about $1\times10^{-7}$ Siemens per centimeter to about $1\times10^{-3}$ Siemens per centimeter at 25° C. and an ionic conductivity of about $5\times10^{-7}$ Siemens per centimeter to about $1\times10^{-3}$ Siemens per centimeter at 25° C.

19. An electrode comprising:
    a current collector; and
    the mixed conductor of claim 1 on the current collector.

20. The electrode of claim 19, further comprising an oxygen oxidation/reduction catalyst.

21. An electrochemical device comprising:
    a cathode;
    an anode; and
    an electrolyte between the cathode and the anode, wherein at least one of the cathode, the anode, and the electrolyte comprises the mixed conductor according to claim 1.

22. The electrochemical device of claim 21, wherein the electrochemical device is a battery, an accumulator, a supercapacitor, a fuel cell, a sensor, or an electrochromic device.

23. The electrochemical device of claim 21, wherein in the electrochemical device, the cathode comprises the mixed conductor.

24. A method of preparing a mixed conductor, the method comprising:
    mixing an A-element containing precursor and an M-element containing precursor to prepare a mixture; and
    thermally treating the mixture in a solid phase to prepare the mixed conductor,
    wherein the mixed conductor is represented by Formula 1

$$A_{1\pm x}M_{2\pm y}O_{4-\delta} \quad \text{Formula 1}$$

wherein, in Formula 1,
   A is a monovalent cation,
   M is at least one of a monovalent cation, a divalent cation, a trivalent cation, a tetravalent cation, a pentavalent cation, or a hexavalent cation,
   $0 \leq x \leq 1$, $0 \leq y \leq 2$, and
   $0 \leq \delta \leq 1$, with the proviso that when M includes vanadium, $0 < \delta \leq 1$, and
   wherein the mixed conductor has an inverse spinel crystal structure.

25. The method of claim 24, wherein the thermally-treating comprises:
    first thermally treating the mixture under a dry and oxidizing condition to prepare a first thermal treatment product;
    grinding the first thermal treatment product; pressing the ground first thermal treatment product to thereby prepare a pellet; and
    second thermally treatment the pellets under a reducing condition, an oxidizing condition, or an oxidizing condition and reducing condition to prepare the mixed conductor.

26. The method of claim 25, wherein the first thermally treating comprises treating at a temperature of about 600° C. to about 1,000° C. for about 2 hours to about 10 hours, and the second thermally treating comprises treating at a temperature of about 700° C. to about 1,400° C. for about 6 hours to about 48 hours.

27. The method of claim 24, wherein the A-element containing precursor is a salt or an oxide of A, and the M-element containing precursor is a salt or an oxide of M.

* * * * *